P. N. RAMSEY.
APPARATUS FOR THE RECOVERY OF PRECIOUS METALS FROM METALLIFEROUS EARTHS.
APPLICATION FILED OCT. 16, 1897.
1,187,927.
Patented June 20, 1916.
15 SHEETS—SHEET 6.
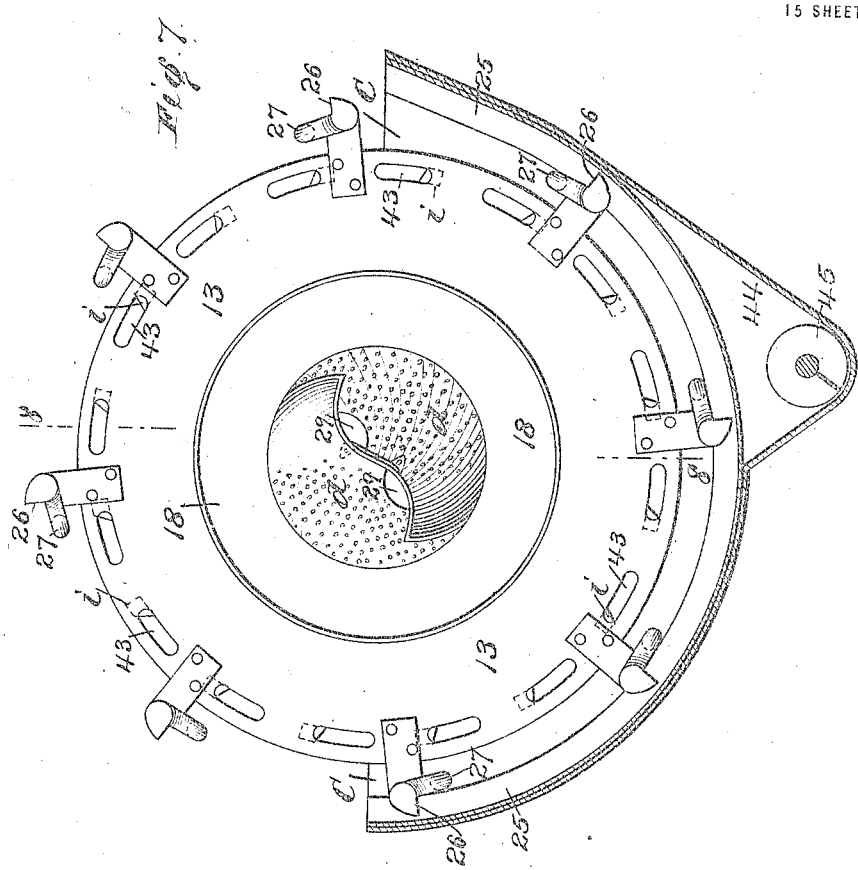
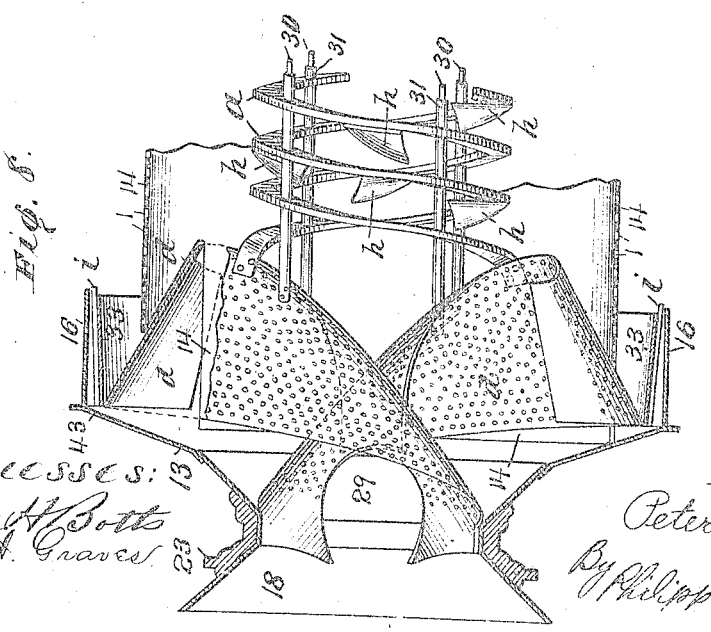

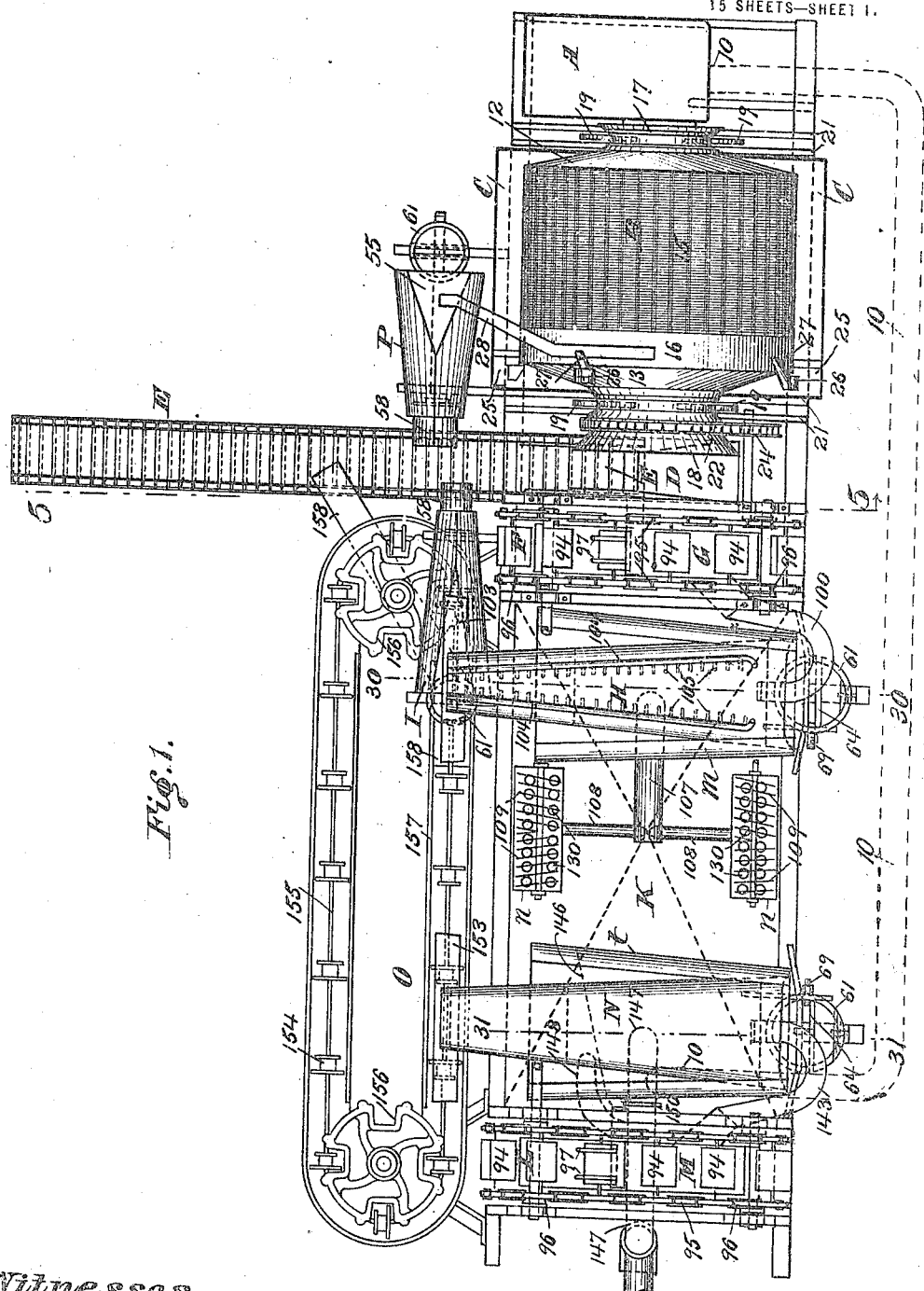

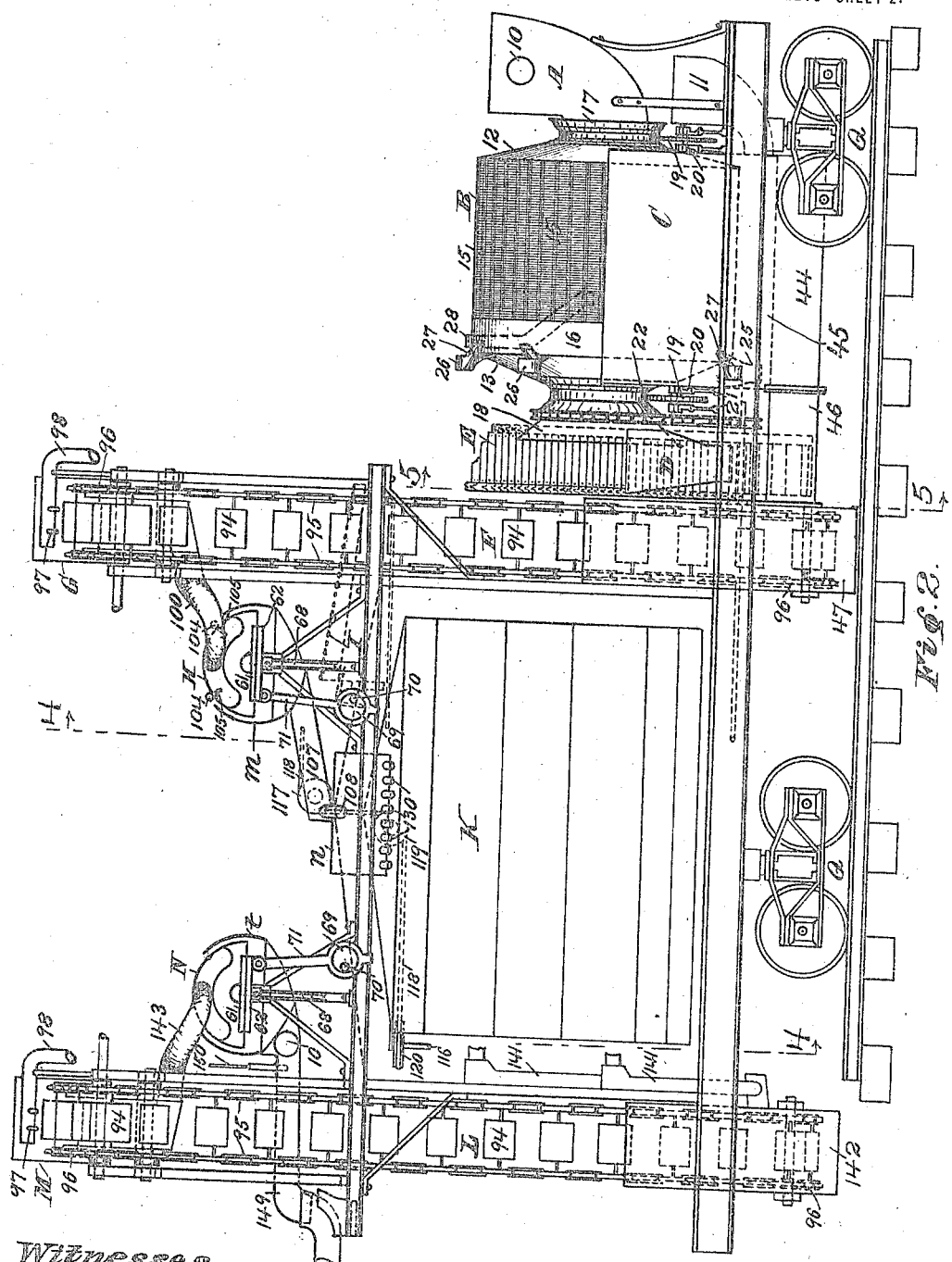

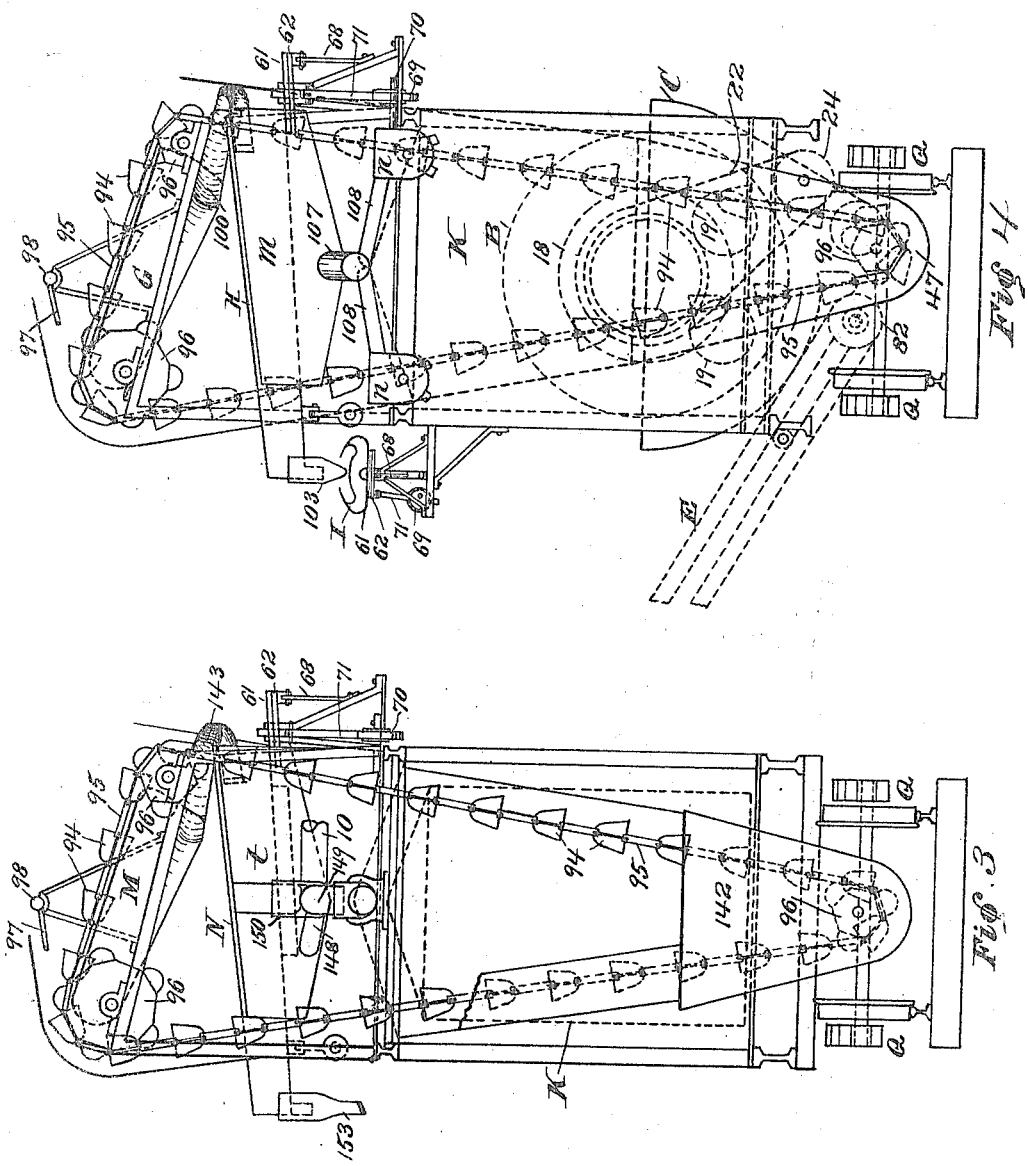

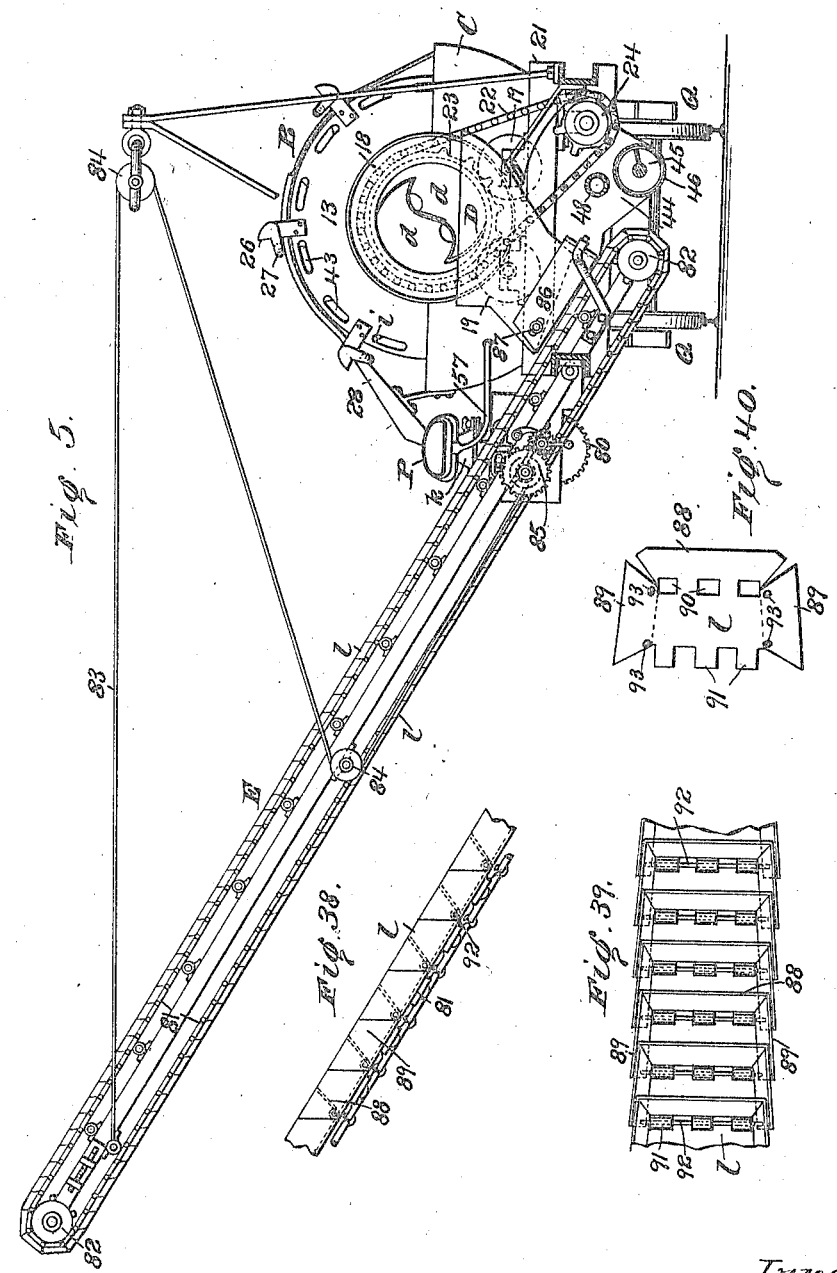

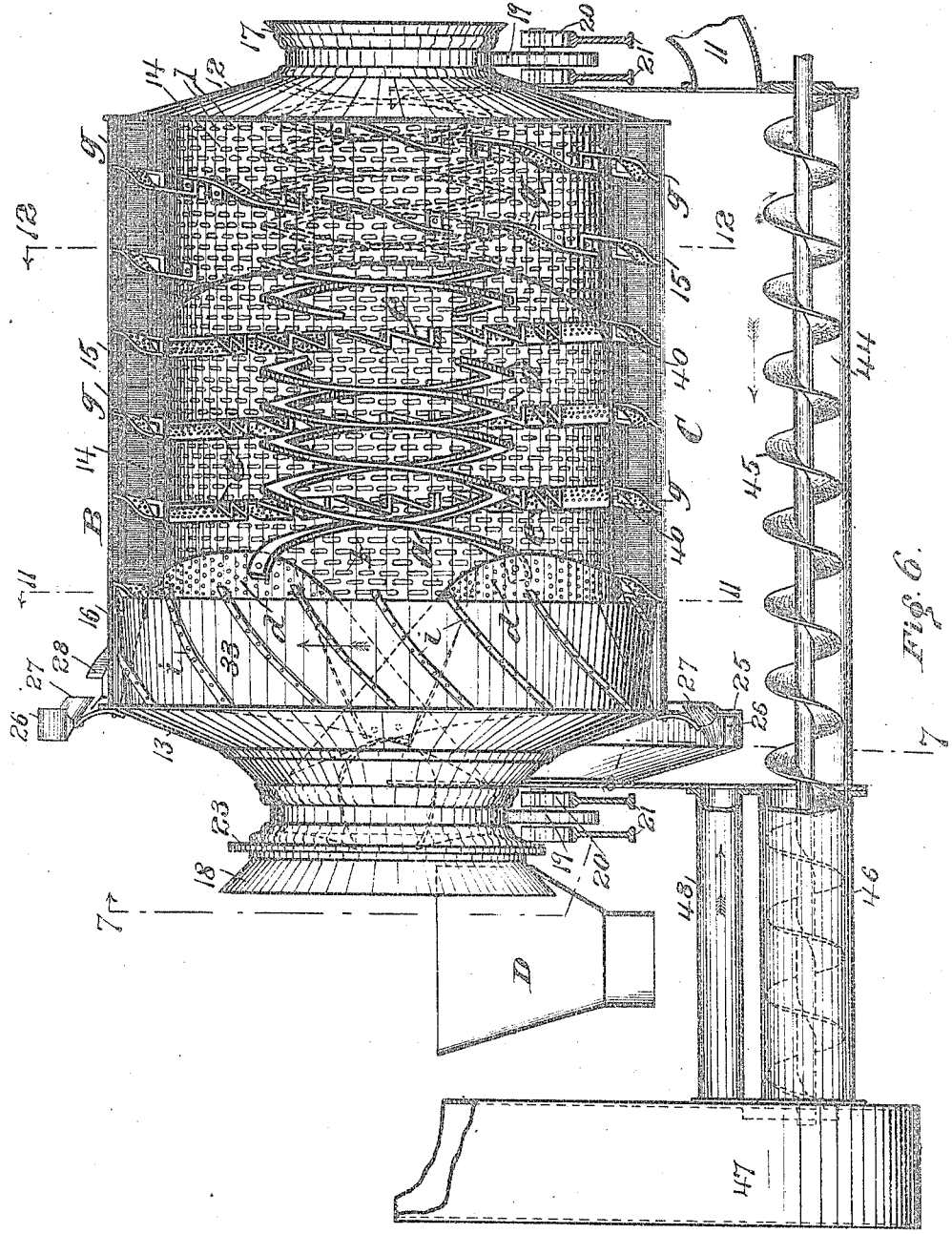

P. N. RAMSEY.
APPARATUS FOR THE RECOVERY OF PRECIOUS METALS FROM METALLIFEROUS EARTHS.
APPLICATION FILED OCT. 16, 1897.
1,187,927.
Patented June 20, 1916.
15 SHEETS—SHEET 7.
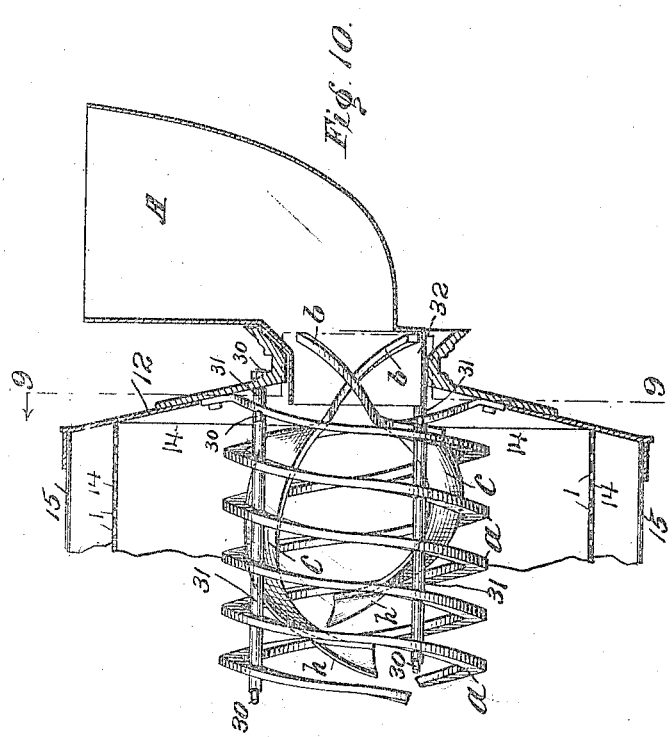
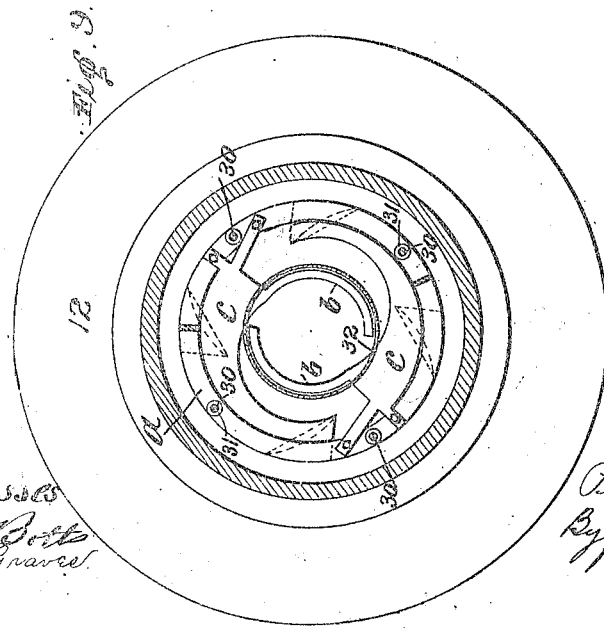

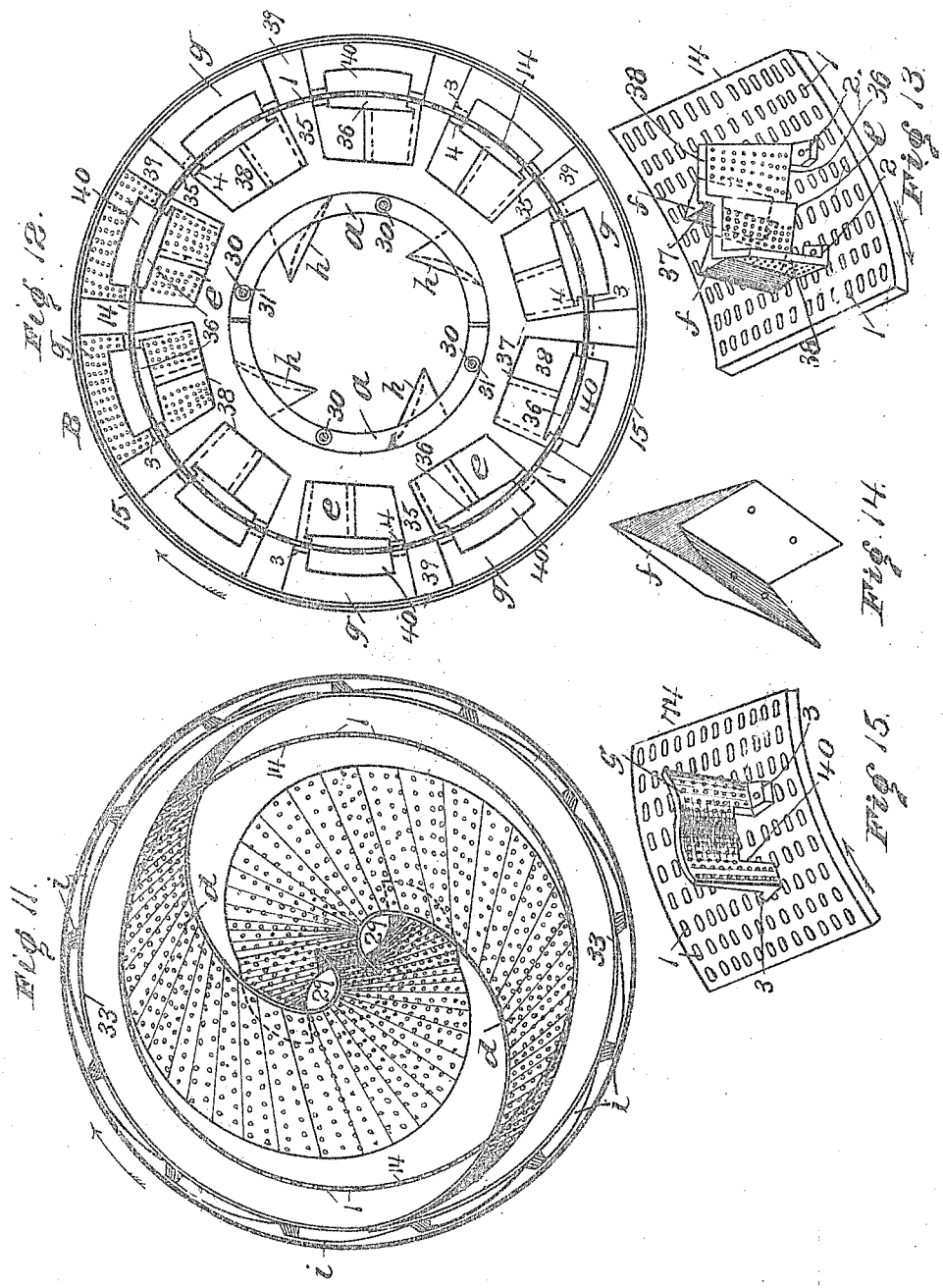

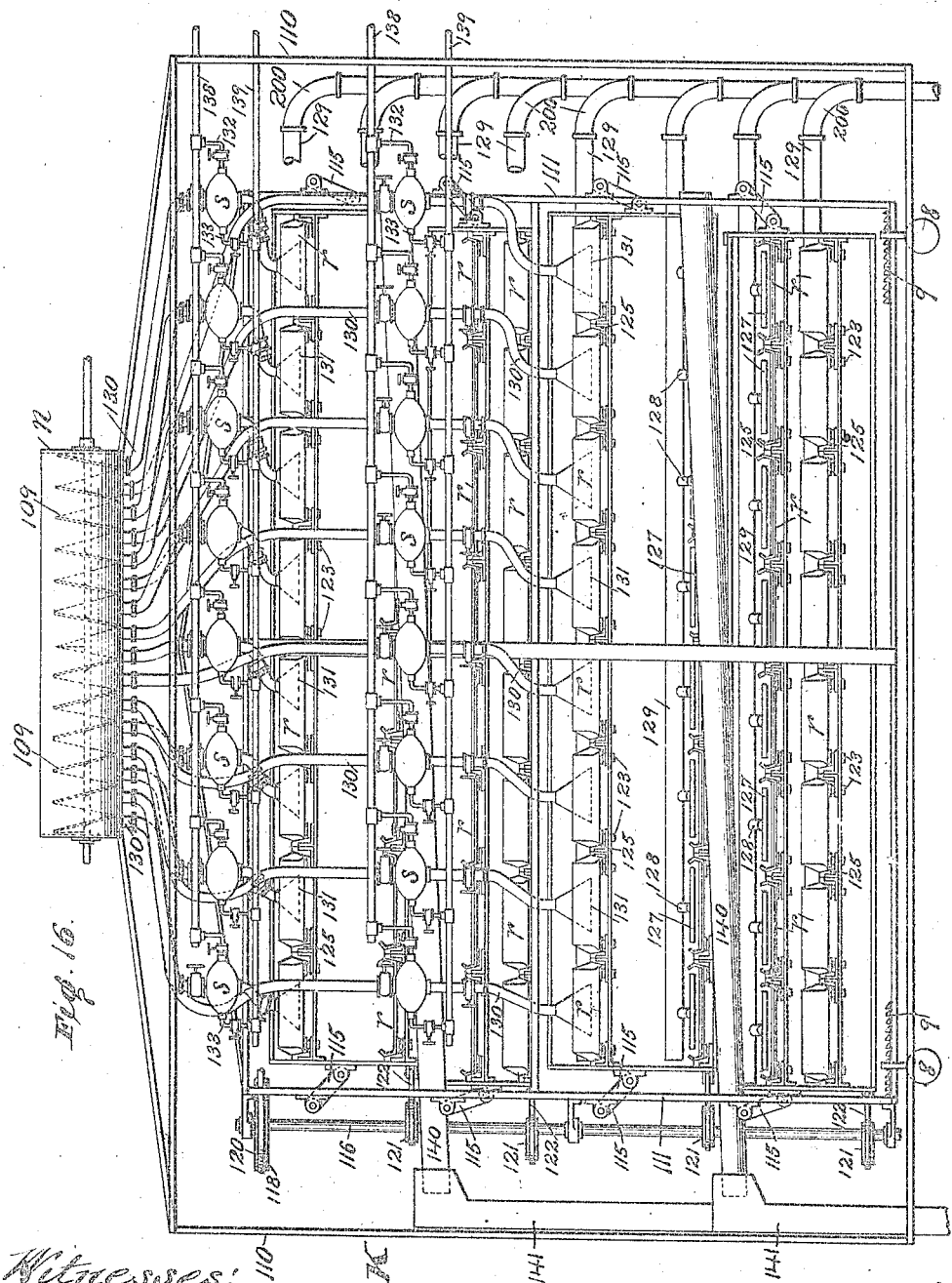

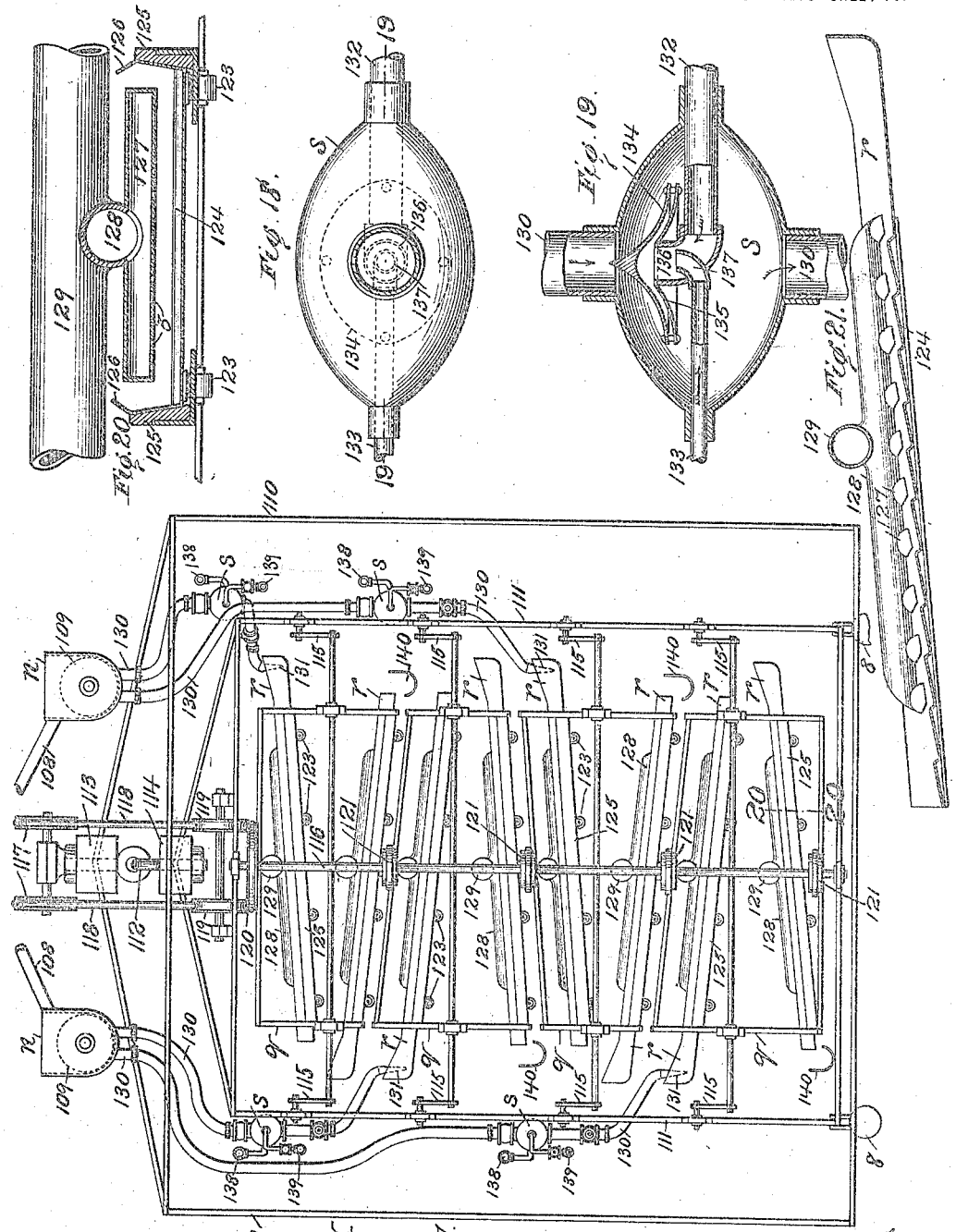

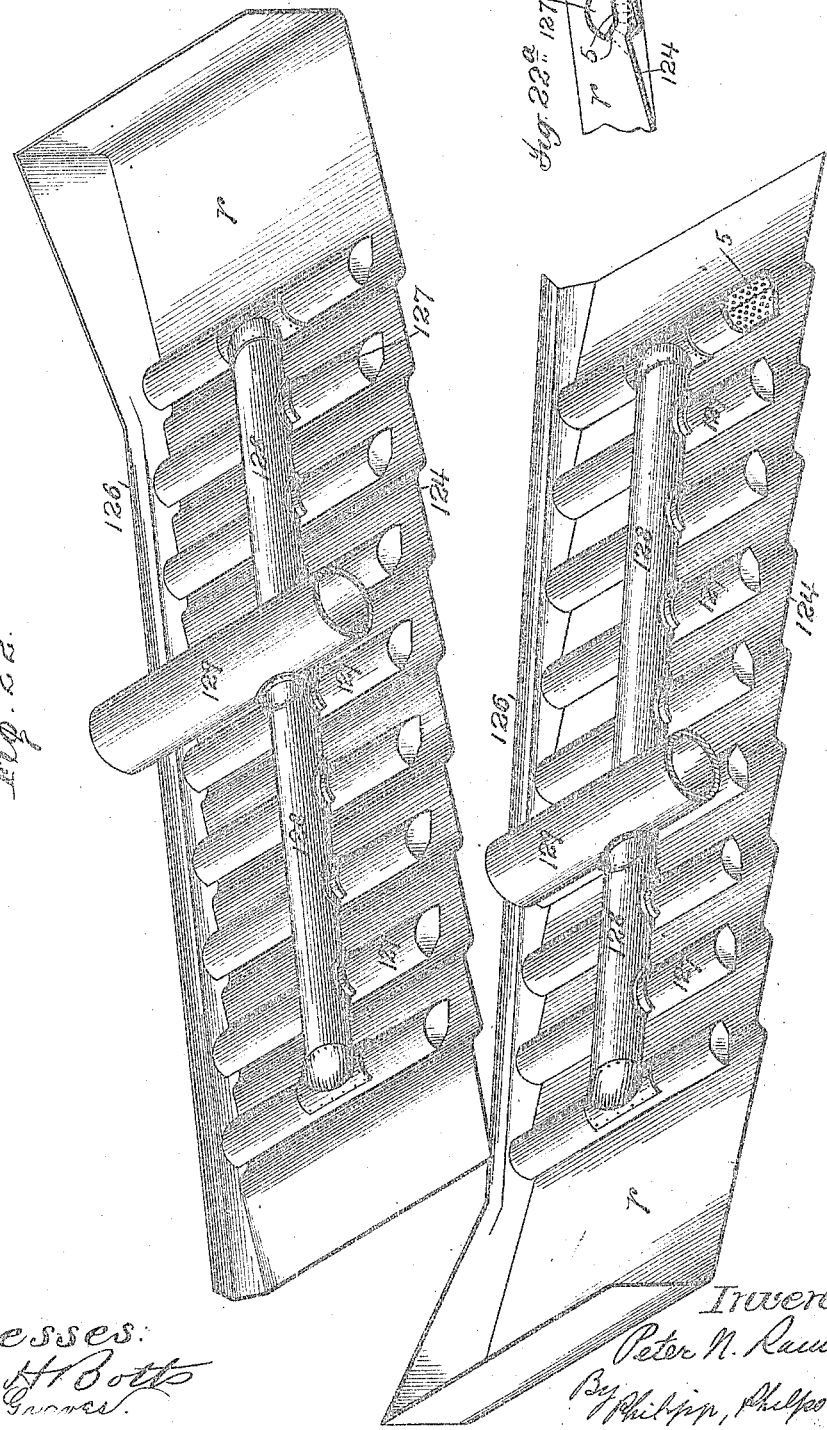

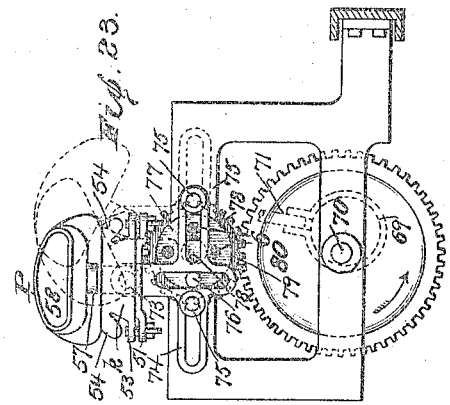

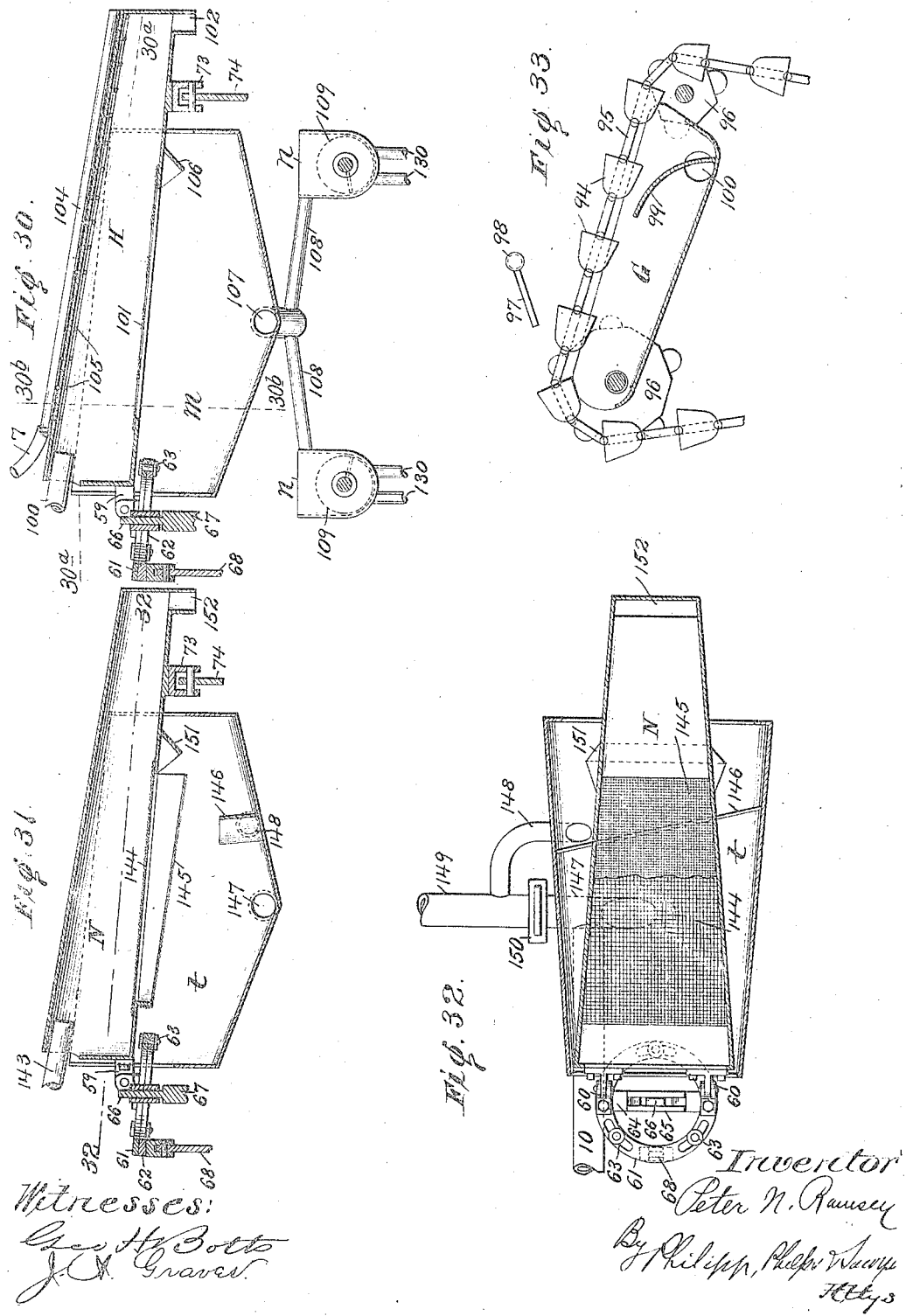

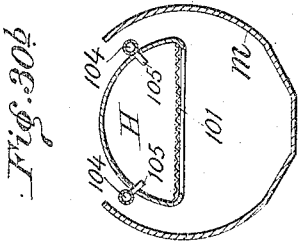
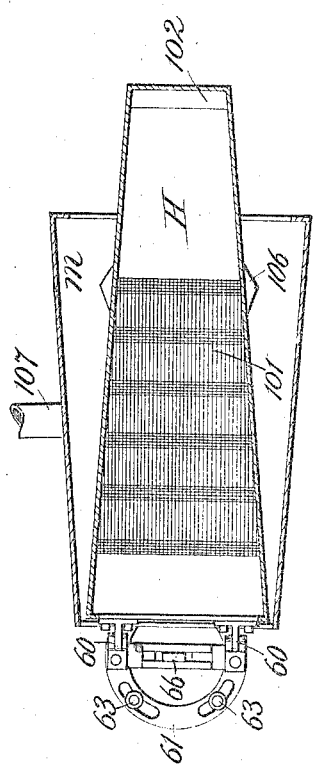
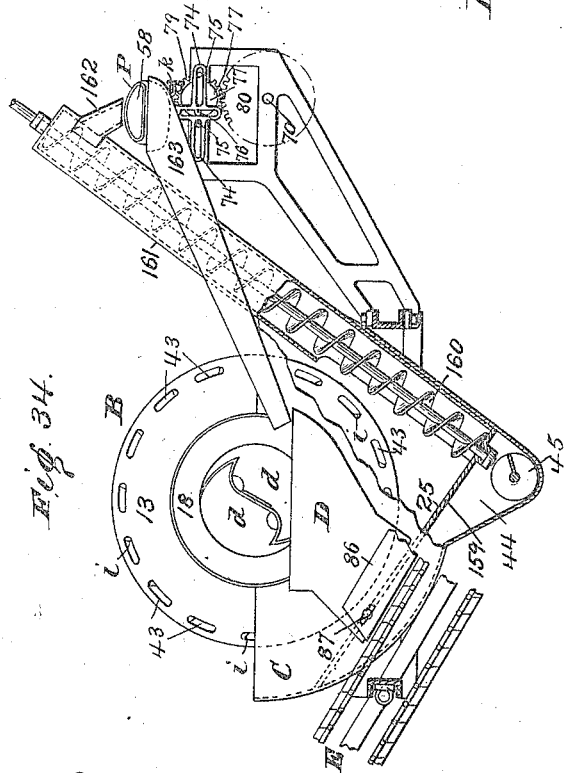

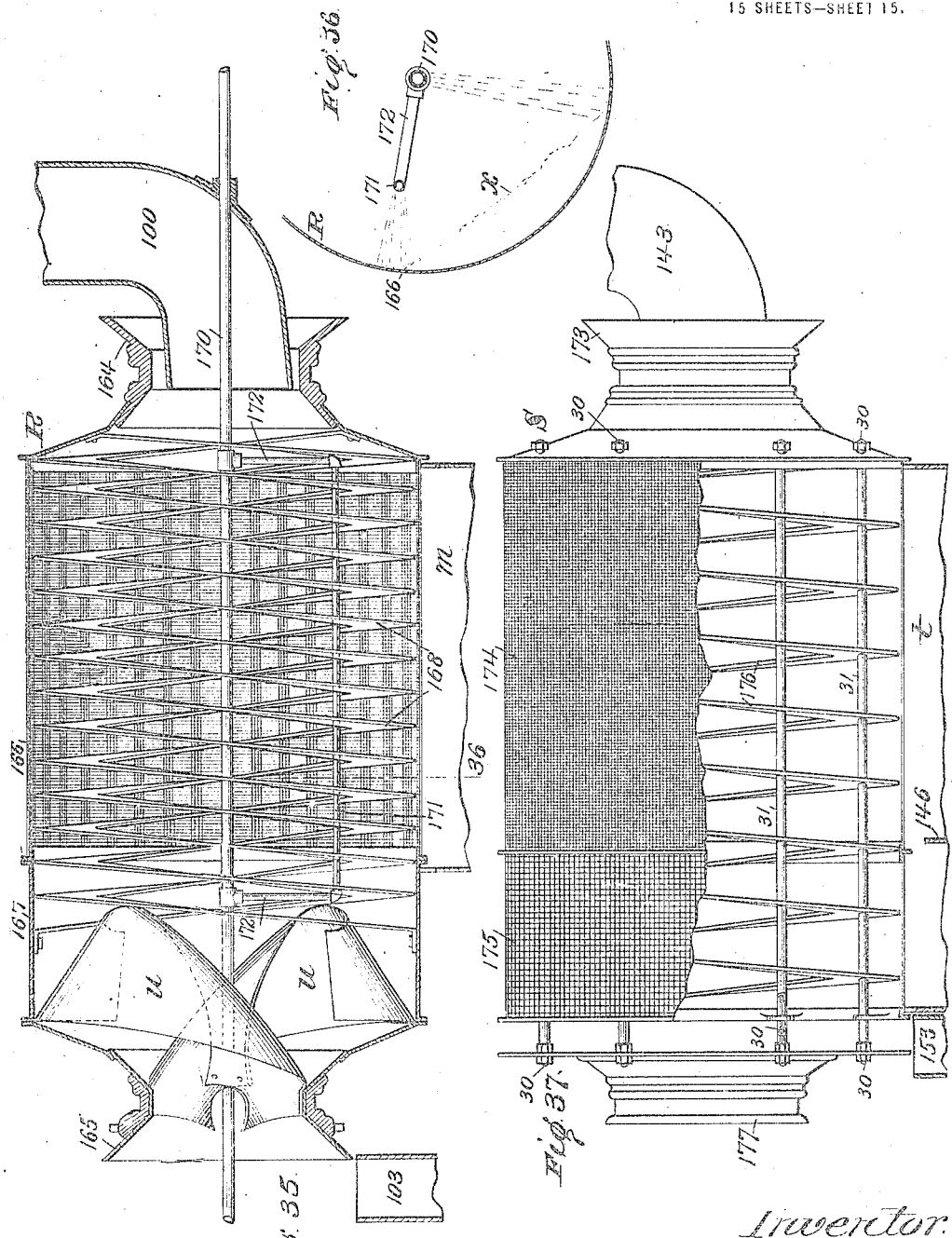

UNITED STATES PATENT OFFICE.

PETER N. RAMSEY, OF NEW YORK, N. Y.

APPARATUS FOR THE RECOVERY OF PRECIOUS METALS FROM METALLIFEROUS EARTHS.

1,187,927.

Specification of Letters Patent.  Patented June 20, 1916.

Application filed October 16, 1897. Serial No. 655,474.

*To all whom it may concern:*

Be it known that I, PETER N. RAMSEY, a citizen of the United States, residing at New York, county of New York, and State of New York, have invented certain new and useful Improvements in Apparatus for the Recovery of Precious Metals from Metalliferous Earths, fully described and represented in the following specification and the accompanying drawings, forming a part of the same.

This invention relates to an improved apparatus for the recovery of valuable metals and metalliferous earths by processes of mechanical separation and amalgamation, the especial object of the invention being the production of an apparatus by which such material from placer beds or river bottoms may be treated in a single apparatus of compact form with little water and so rapidly and efficiently that material containing but a very low percentage of metal may be handled profitably.

The complete apparatus in its preferred form comprises a washer and separator in which the material as it comes from the earth is treated for the removal of the coarse waste from the finer material containing the metal, the coarser gravity metal and metal bearing particles removed separately from the waste and finer material, separating devices by which the finer valuable material is divided into fine and less fine material, and an amalgamator to which the fine material passes, said less fine material, as well as the coarser gravity metal and metal bearing particles previously referred to, being treated by gravity and amalgamating devices, and the waste from the amalgamator being subjected to another separation so as to save the cleaner water for reuse in the apparatus when economy of water is important, as is frequently the case. While, however, an important part of the invention consists in features of construction and combination of devices in an apparatus for the complete treatment of metalliferous earths, many parts of my apparatus may be used in machines by which only a partial treatment of such material is performed, or other metal carrying material is treated, and my improved separator and many features therein for removing the coarser portion of the material may be used in the separation of materials for other purposes than the recovery of precious metals and in treating materials of many different classes, and the invention therefore, includes various features of construction and combinations of parts in separating, amalgamating, gravity washing, and other devices used in my apparatus, all as particularly pointed out and distinctly claimed hereafter.

As a full understanding of the invention can best be given by a detailed description of a construction embodying the same, such a description will now be given in connection with the accompanying drawings illustrating an apparatus embodying all the features of the invention in the best form now known to me, and the features forming the invention will then be specifically pointed out in the claims.

In the drawings Figure 1 is a plan view of the apparatus, largely diagrammatic. Fig. 2 is a similar side view of the apparatus. Fig. 3 is an end view of the apparatus looking to the right in Figs. 1 and 2. Fig. 4 is a section on the line 4 of Fig. 2 looking to the right. Fig. 5 is a section on line 5 of Figs. 1 and 2 looking to the right. Fig. 6 is an enlarged longitudinal sectional elevation of the rotary washer and separator, the outer cylinder being shown in section and the inner cylinder partly in section and partly in elevation for purpose of illustration. Fig. 7 is a sectional end elevation of the separator looking to the right from line 7 of Fig. 6. Fig. 8 is a longitudinal section of the delivery end of the separator with the perforated feeding spirals omitted and showing especially the discharging devices of the separator and the mounting of the inner feed spiral, the view being taken on line 8 of Fig. 7. Fig. 9 is an end view of the receiving end of the separator looking to the left from line 9 of Fig. 10. Fig. 10 is a central longitudinal section of the receiving end of the separator with the perforated feeding spirals and plows *h* omitted, and showing especially the center feed spiral, and devices for feeding material thereto. Figs. 11 and 12 are sections on respectively lines 11 and 12 of Fig. 6 looking to the left. Fig. 13 is a detail perspective of a portion of the inner screen and interrupted spiral inside the same. Fig. 14 is an enlarged perspective detail of one of the plows shown in Fig. 13. Fig. 15 is a perspective view of the outer side of the inner screen and feeding blades thereon. Fig. 16 is an enlarged side view of the amalgamating portion of the apparatus looking in the same direction as Fig. 2. Fig. 17 is an end view of the same looking to the right in Fig. 16. Fig. 18 is a detail view of the washer and chemical feeding chamber. Fig. 19 is a central vertical section of the same on the line 19 of Fig. 18. Fig. 20 is a detail cross section of one of the amalgamating plates and spray pipe for the same. Fig. 21 is a central longitudinal section of the same. Fig. 22 is a perspective view of upper and lower amalgamating plates forming a pair, in their respective positions in the apparatus. Fig. 22$^a$ is a detail enlarged cross section of one of the mercury pots and corresponding spray pipe. Fig. 23 is a detail end view of one of the gravity and amalgamating rockers looking to the left in Fig. 24. Fig. 24 is a side elevation of the same. Fig. 25 is an end view of the same looking to the right in Fig. 24. Fig. 26 is a horizontal section on the line 26 of Fig. 24. Fig. 27 is a cross section of the pan on the line 27 of Fig. 24. Fig. 28 is a longitudinal section on the line 28 of Fig. 27. Fig. 29 is a detail section on the line 29 of Fig. 26. Fig. 30 is a longitudinal central section of the separating rocker and tank from which the fine material passes to the amalgamator, taken on the line 30 of Fig. 1. Fig. 30$^a$ is a horizontal section on the line 30$^a$ of Fig. 30. Fig. 30$^b$ is a vertical section on the line 30$^b$ of Fig. 30. Fig. 31 is a similar section of the separating rocker for the waste from the amalgamator taken on the line 31 of Fig. 1. Fig. 32 is a horizontal section on the line 32 of Fig. 31. Fig. 33 is a detail central section of one of the tanks to which the bucket elevators deliver. Fig. 34 shows a modified construction employing a screw elevator for delivering the heavier material from the washer and separator to its rocker. Fig. 35 is a longitudinal central section of a cylindrical separator that may be used in place of the separating rocker from which the fine material passes to the amalgamator. Fig. 36 is a detail cross section of Fig. 35 on the line 36 showing the jet pipe therein. Fig. 37 is a vertical elevation of a cylindrical separator that may be used in place of the separating rocker for the waste from the amalgamator, the separator screen being partially broken away to show the construction. Figs. 38 to 40 show in detail the preferred construction of the conveyer for delivering the waste material, Figs. 38 and 39 being respectively a detail side view and a plan view of a series of the buckets and Fig. 40 a plan of one of the blanks from which the buckets are made.

A brief statement of the general features of the particular apparatus shown will first be given, from which the further detailed description of the specific construction and operation of the various parts will be more readily understood.

The material to be treated is delivered through a hopper A to a cylindrical washer and separator B rotating in a tank C partially filled with water, the coarse waste from this rotating separator B being delivered through a chute D upon a conveyer E by which it is carried away from the apparatus and delivered at any convenient point, while the finer valuable material that passes through the outer screen of the separator B falls into the tank C and is delivered therefrom to a bucket elevator F, which raises this material to a tank G from which it passes to a second separator. This second separator consists of a rocker H of special construction and movement by which the material is divided into fine and less fine material, the less fine passing to another rocker I for the recovery of the free metal and metal carrying particles by gravity and amalgamation, and the fine material passing to the amalgamator K, which is provided with inclined amalgamating plates and devices co-acting therewith for the efficient recovery of the metal by amalgamation. The waste material from the amalgamator passes to a second bucket elevator L by which it is raised and delivered to another tank M, which may be similar to the tank G, and from which it passes to another separating device, preferably a rocker N having the same movement as the rocker H but constructed to separate out the solid material or tailings and deliver it to a carrier O for delivery to the conveyer E, and acting to separate the water into two portions, the cleaner to be returned, if desired, to the hopper or tank C to be used again and the dirtier water to be delivered to waste. The washer separator B in the preferred form shown acts also to separate out the heavier portion of the material that collects on the outer screen at the end of the separator, which is the metal carrying material larger than that passing through the separator into the tank C for further treatment, as described, which material is delivered from the separator to a rocker P similar in construction and movement to the rocker I and in which the free metal and metal carrying particles are recovered by gravity and amalgamation, the waste material from this rocker also passing to the conveyer E, so that the conveyer E, in the apparatus shown, delivers all the waste solid material. The entire apparatus is shown as mounted upon trucks Q running upon rails so that the apparatus may be readily moved along the bank or excavation from which the material to be treated is being taken.

Proceeding now with the detailed description of the invention, the parts of the apparatus shown will be described in substantially the order in which they operate upon the material in its passage through the apparatus, and a full description of the operation of the apparatus will then be given. The hopper A, through which the material is fed to the separator B is shown as provided on one side with a water pipe 10 through which the desired quantity of water is introduced with the material to secure the proper operation of the apparatus, and an overflow pipe 11 is mounted below the hopper and receiving end of the separator B through which any overflow of water from the hopper or separator passes to the tank C. This pipe 10 may deliver from the last separator of the apparatus as shown and hereafter described, or from any suitable outside source. The separator B is of cylindrical form comprising two heads 12, 13 which sustain an inner screen 14, an outer screen 15, an unperforated outer ring 16 at the delivery end of the separator and thus forming a continuation of the screen 15, an inner ring 33 forming an annular chamber between it and ring 16, together with feeding and delivery devices, and these heads 12, 13 are flanged outward centrally in opposite directions to form the receiving mouth 17 and discharge mouth 18, which flanges at opposite ends of the separator, also form hollow journals having peripheral channels by which they are seated so as to freely turn upon wheels 19 and be held in proper longitudinal position thereby, the wheels 19 being mounted in bearings 20 in fixed position on the frame, being shown as supported by cross beams 21. The separator B may be rotated by any suitable means, but is shown as driven by a chain 22 running over a sprocket ring 23 at the delivery end of the separator, and a sprocket wheel 24 on the driving shaft.

At its delivery end, the separator B is provided with a series of buckets which operate to remove material delivered by the separator, as hereafter described, from a narrow cylindrical chamber or tank 25 extending about the lower half of the delivery end of the separator inside tank C, these buckets being formed with receiving mouths 26 by which the material is scooped up from the chamber 25 and delivery mouths 27 by which the material is delivered sidewise to chute 28 from which it passes to the recker P.

Referring now to the specific construction of the separator B by which the feeding and separating functions are performed, the inner screen 14 preferably consists, as shown, of a sheet of quite heavy metal provided with perforations 1 preferably arranged in lines about the cylinder and elongated as shown, these perforations being of suitable size according to the material to be treated. The inner screen 14 is firmly secured to the opposite separator heads 12, 13 and carried thereby and forms a rigid and strong cylinder construction. The outer screen 15 is of finer mesh than the inner screen, and, with the thorough disintegration of the material and repeated efficient action thereon secured by my improved construction, this screen may be much finer than heretofore used in separators of this class, so as to reduce largely the size and amount of the material delivered for further treatment, and this screen is preferably a bar screen, as shown, so as to permit the flake metal to pass through, although quite fine mesh screen be used. This screen supports only the material passing through the screen 14, so that it need be capable of sustaining but little weight and is attached in any suitable manner for convenient renewal.

Within the separator is the central feeding spiral $a$, preferably double, as shown, and consisting in the preferred form shown of two strong spirally bent bars of metal having one of their ends secured to the head 12 and the other end to the discharging buckets $d$ presently to be described, and tied together and held firmly in position by rods 30 secured to the head 12 and discharging buckets $d$ and passing through the spirals, four such rods being shown, with washers 31 on the rods between the successive spirals so as to hold the latter firmly at the required distance apart and in proper form. This construction may be varied but will be found to provide a very strong feeding spiral construction by which very large stones may be handled efficiently. This feeding spiral $a$ provides feeding space within the spiral for material too large to pass between the successive spirals and space between it and the screen 14 for the smaller material that passes laterally out of the spiral, the material to be treated being delivered to the inside of spiral $a$.

The material is drawn into the separator from the hopper A and fed to the inside of spiral $a$ by raking fingers $b$ carried by the separator and projecting through the throat of the separator and delivery mouth of the hopper. Within the spiral $a$ these raking fingers preferably develop into spirally curved blades $c$ extending a considerable distance into the spiral so as to feed the material along rapidly at the receiving end of the spiral and distribute it so as to secure efficient action of the whole of the separator and prevent choking the inner spiral which otherwise might occur. The proper feeding of the material from the hopper A to the spiral is greatly assisted, also, by the construction shown, in which the bottom of the hopper A is provided with a depressed portion or offset 32 within which the raking fingers $b$ move, so that the material passes from the hopper directly over and onto the raking fingers working below this offset. By this construction, large stones, which otherwise would strike directly against the ends of the raking fingers and are liable to break or bend them, are received upon the tops of the fingers and thus gradually lifted and readily carried into the separator, avoiding danger of injury to the apparatus and secuing certainty in handling large material.

Within the feed spiral $a$ is a series of plows $h$ secured at intervals to the bars forming the spiral. These plows may be omitted but increase the efficiency of the apparatus as heretofore described and are preferably used.

Between the central feeding spiral $a$ and the inner screen 14 is a second feeding spiral, preferably formed, as shown, of a series of spirally arranged teeth $e$ with spaces between them, so as to form an interrupted feeding spiral with sluiceways 35 between the successive portions of the spiral. These teeth are preferably formed with webs 38 set angularly to the spiral and with steps 37 on their forward faces, which steps form lifting surfaces by which the material is repeatedly raised and allowed to drop as the separator rotates. Over the angles formed by the steps and angular webs, are preferably secured strong wedge shaped pieces of metal or plows $f$, with the edge of the wedge presented to the material, and recessed at the base, as shown, so as to overlap on and be secured to the angles of the teeth $e$. In addition to the sluiceways 35 between the teeth $e$ other sluiceways 36 between the teeth and screen 14 are preferably provided, these being formed in the construction shown by ears 2 secured to the screen 14 to hold the teeth, the body of the teeth thus being offset from the screen. The faces and angular webs of these teeth $e$ are preferably perforated, as shown, with a large number of holes suited to the work to be performed, so that the fine material will not be carried on bodily by the spirally arranged teeth but be allowed to pass through these holes and descend to the bottom of the separator and thus through the inner screen to the outer chamber of the separator. The sluiceways 35, 36 through the interrupted spiral also prevent the body of the material being carried directly through the separator, but allow the water and material to wash back through these sluiceways so as to be acted upon again and again before the waste reaches the delivery end of the separator.

Within the outer chamber of the separator between screens 14, 15, is another feeding spiral, preferably interrupted and perforated, and which may consist of teeth similar to teeth $e$ above described but which is preferably formed by spirally arranged blades $g$ separated to form sluiceways 39 between them and which are secured to screen 14 by ears 3 so as to be offset from the screen and form other sluiceways 40 between them and the screen. These blades $g$ may be straight but preferably are curved angularly to the spiral as shown, so as to work against the material as they plow through it, which tends to raise the material and secure the passage of the finer particles through the perforations. The sluiceways 39, 40 act in the same manner as those of the spiral formed by teeth $e$ as previously described, and secure the repeated working over and complete disintegration and separation of the material in the outer chamber.

At the delivery end of the separator is a delivery chamber terminating in the discharge mouth 18 and in which are placed one or more, and preferably two, as shown, lifting discharging buckets $d$ which are spirally curved inward and longitudinally of the separator from the outer chamber and have their webs set angularly to the axis of the separator, as shown, so as to discharge the material rapidly by gravitation. The delivery ends of these buckets lie within the discharging mouth 18 of the separator and are firmly secured to the inner side thereof, and these buckets are preferably cut back, substantially as shown, so as to provide orifices 29 for the delivery of large material. The inner or loading ends of the buckets may be secured to the outer wall of the delivery chamber and the latter formed in any suitable manner, but the construction shown is preferred, in which each of the buckets is extended through a half circle concentrically with the separator and secured together to form a ring 33, as shown in Fig. 11, which is the wall of the delivery chamber, this ring being secured at the edge to the head 13, thus providing a strong rigid support for the buckets $d$ and for the central feeding spiral $a$ which is secured thereto. The ring 33 may form the outer wall of the separator, if the heavier portion of the material on screen 15 is not to be separately removed, but in the construction shown the ring 16 lies outside the ring 33 and forms an annular chamber between the rings, and the ring 33 is preferably inclined as shown, for a purpose presently to be described.

It will be seen that the discharging buckets $d$ have loading webs that extend from the outer chamber of the separator through openings in the screen 14 and through the inner chamber so as to deliver material from the three feeding spirals. As shown in Fig. 8, the openings through the screen 14 are formed so as to permit the material to be carried by the buckets $d$ from the outer chamber to the delivery point. The discharging buckets $d$ are preferably perforated throughout, as shown, so as to permit all the water taken up thereby to pass through the perforations and not be delivered by the buckets.

The construction shown having two discharging buckets, is preferred as securing best the rapid delivery of large material with a small separator and discharge mouth. If a single bucket be used, large material may be delivered, but more slowly, while a greater number of buckets increases the rate of delivery but requires a larger discharge mouth for the delivery of large material than with two buckets.

Through the annular chamber between the rings 16, 33 is delivered the heavier portion of the material collected at the end of screen 15, by a series of inclined lifting fingers $i$ forming buckets and projecting through the narrow opening between rings 16, 33 and over the end of screen 15, these fingers operating to cut out the bottom layers of material on the screen 15 and raise and deliver them through the annular chamber and from the separator through a series of openings 43 into the tank or chamber 25 previously referred to, and from which the material is removed by the buckets 26, 27. The inner plate 33 is inclined as shown in Figs. 6 and 8 so as to enlarge the annular chamber inside the narrow opening onto the screen, and thus permit the material to pass down freely along the fingers $i$ to the openings 43 as the separator rotates. The feeding surfaces of the fingers $i$ are preferably inclined, as shown, so as to form troughs for the material carried thereby. The waste material delivered by the discharging buckets $d$ through the mouth 18 passes through the chute D below it directly onto the lower end of the conveyer E and is thus suitably delivered.

The fine valuable material that passes through the outer screen 15 into the tank C passes into the lower part of the tank which is arranged so as to guide this material to a bottom chamber 44 therein, in which runs a screw conveyer 45 which forces this material through a pipe 46 to a tank 47 in which the lower end of the chain of elevator buckets F runs and from which this material is taken by said buckets. The screw 45 is run at a high rate of speed so as to act in conjunction with the pipe 46 as a suction device by which a strong suction action is exerted upon the material in the separator B, this aiding materially in securing the removal of fine flake and flour metal from the material in the separator and its delivery through the outer screen 15 to the tank C. It will be understood that other devices may be used for the delivery of the material from the tank C and for maintaining a suitable suction upon the separator, but the form shown is simple and will be found well adapted for the purpose.

The water within the tank C is preferably maintained at a level up to or near the bottoms of the receiving and delivering mouths of the separator, and the overflow of the tank 47 by water carried from the tank C is prevented by the overflow pipe 48 connecting tank 47 with tank C.

The coarse gravity material delivered by the fingers $i$ to the chamber 25 and thence by the buckets 26, 27 through the chute 28 is to be treated for the recovery of metal therefrom, and this is done by gravity devices with which is preferably used amalgamation, these gravity devices in the preferred form shown consisting of rocker P, in which this material is treated so as to recover by gravity and amalgamation the free metal and metal bearing particles, the waste material from said rocker preferably being delivered to the conveyer E and the water from which such material has been removed being returned to the tank C again for use in the apparatus, if it is desired to economize in water.

The construction of this rocker and its actuating parts is as follows, the object being to provide an improved rocker securing by a movement resembling that employed in hand panning the efficient and rapid separation of the metals from the waste. Referring now especially to Figs. 23 to 29, the rocker pan P is preferably formed as shown with curved sides and tapering sidewise from its rear or receiving end to its forward or delivering end so as to direct the material received thereby toward the center of the pan, and is preferably covered, as shown, throughout substantially its entire length so as to avoid splashing therefrom during its movement, the pan thus being of an approximately elliptical or a flattened elliptical shape in cross section and inclined downward toward its delivery end so that the water and material therein will gradually pass onward through the rocker to its lower delivering end.

In the bottom of the rocker is preferably formed a longitudinal groove 49, shown as increasing in width from the receiving to the delivering end of the pan, and along this groove are formed openings in the bottom of the pan and below these openings are mercury cups $k$. One or more such openings and mercury cups may be used, but preferably a considerable number, four being shown for purpose of illustration. These mercury cups $k$ consist of a metal body provided with a top cup-shaped recess for holding mercury to substantially the level of the bottom of the groove 49, this body being provided with ears 51 by which the cup is removably secured by screws 52 to corresponding ears or flanges 53 formed on the bottom of the pan P. To form a tight joint between the cup and pan, the inclined surfaces 50 on the pan and cup are used, the cup thus being forced into the opening by the screws 52 and wedging therein. Opposite each of the mercury cups and on opposite sides of the groove 49, the bottom of the pan P is constructed to form pockets 54, preferably of sufficient capacity to hold all or substantially all the mercury contained in the cup, so that the mercury may run into one or the other of these pockets as the pan is rocked in opposite directions and thus be retained from flowing longitudinally of the pan. These pockets 54 are preferably formed with hoods 4 which extend over the mercury cup and preferably to or substantially to the sides of the groove 49, thus efficiently preventing any splashing of the mercury from the cup, each mercury cup in this construction thus being independent of the other cups and retaining its own mercury.

The pan is provided with a top opening 55 at its upper or receiving end through which the material to be treated is received from the chute 28 and at its delivering end beyond the mercury cups $k$ is formed with a screen 56 over which passes the material not retained by the mercury in the cups, and through which screen the water runs to delivering pipe 57 which preferably connects with the tank C, as shown, so that the water from the pan will pass back to the tank and be used over again in the apparatus, while any metal therein, that may possibly not be retained in the pan will be delivered from the tank C for further treatment with the other material therein. Beyond the screen 56 the rocker is provided with a delivery mouth 58 through which the waste solid material is delivered directly to the conveyer E to be delivered thereby with the coarse material received by the conveyer from the separator B.

The means shown for mounting and operating the pan P are as follows:—The pan is provided at its upper end with longitudinally projecting ears 59 by which it is hinged to swing vertically on pivots in vertical ears 60 carried by a ring or plate 61 which has a free horizontal movement on a ring 62 on which it is mounted, the two rings being connected by a slot and screw connection 63 permitting the upper ring to turn freely upon the lower. A suitable antifriction bearing is preferably used between the rings 61, 62. The bottom ring 62 is provided with a cross bar 64 having an upwardly extended hub 65 provided with a central narrow opening through which passes a guide 66 carried by a vertical standard 67 mounted on the frame of the machine and acting to hold the ring against movement longitudinally of the pan while permitting its free rocking movement transversely to the pan. The bottom ring 62 is also hinged at its extreme rear edge centrally of the pan to a vertical support 68 mounted on the frame of the machine so that this ring 62 is free to be rocked vertically so as to give the pan a vertical rocking movement about a central axis longitudinal of the pan. This rocking is preferably obtained by a crank movement of some suitable form, the fast and slow movement thus secured being found especially efficient in my construction but other means may be used for this rocking movement with fairly good results. As shown, the crank movement preferably employed consists of an eccentric 69 carried by a driving shaft 70 and actuating the pan through an eccentric rod 71 pivotally connected to ears 72 depending from the ring 62.

The pan P has a horizontal oscillating movement combined with the vertical rocking movement, the pan swinging bodily on the pivot at its rear end formed by the rings 61, 62, so that the oscillation increases in extent from the upper receiving to the lower delivering end of the rocker. This movement may be secured by other means with results greatly improved over constructions now in use for the same purpose but the use of a crank movement for this horizontal oscillation of the pan is very important as the quick throw of such a movement with the gradually increasing and decreasing speed before and after this throw produces, in combination with the vertical rocking of the pan and properly timed relatively thereto, a peculiar movement which I have found very efficient in gravity separation. While this horizontal oscillation may be such that the complete rocking and oscillating movements are performed in the same time, it is much preferable that the oscillating movement be quite rapid relatively to the rocking movement, and I preferably use a construction in which a plurality of oscillating movements are performed to each rocking movement, two oscillating to one rocking movement being very efficient, although this may be varied. The means for securing this horizontal oscillating movement are as follows:—Upon its underside and preferably near its delivery end, as shown, the rocker is provided with depending ears 73 by which the rocker is pivotally connected to a vertical arm on a slotted plate 74 which is mounted to slide transversely to the pan P on the frame of the machine, being secured thereto by bolts 75 passing through slots in horizontal arms on the plate, so as to hold the latter in place while permitting its free horizontal movement. The plate 74 is provided also with a central vertical slot entered by a crank pin 76 carried by crank disk 77 on a short shaft 78 carrying a pinion 79 which meshes with and is driven by a gear 80 on the driving shaft 70. By the rotation of the disk 77 through shaft 78 and pinion 79, therefore, the crank pin 76 is actuated so that, by its movement in the vertical slot in the plate 74, the plate 74 is reciprocated horizontally and swings the pan P from side to side by turning the ring 61 horizontally upon the ring 62. At the same time the pan is being rocked vertically by the eccentric 69 so that the rocker has a vertical rocking movement and a horizontal oscillating movement. The correct relative positions of the crank pin 76 and the eccentric 69 are shown in Fig. 23, the crank pin and eccentric being timed two to one and the eccentric being dotted through the gear 80, these positions corresponding to the position of the pan as shown in full lines in this figure, that is when at the limit of its movement in one direction, the left in the view, in which position the pan is always level, while at the limit of its movement in the opposite direction, that is, to the right in the view, the pan is tipped by the rocking movement given by the eccentric, and alternately to right and left on successive throws of the crank pin, as shown in dotted lines in Fig. 23. The crank movement is preferably adjustable so as to vary the throw in accordance with the material to be treated and the result desired, the crank disk 77 being shown as provided with a series of holes 6 for the crank pin 76, these holes being at different distances from the center.

While the pan is preferably provided with removable mercury cups or otherwise formed so as to employ the process of amalgamation in the recovery of the metal, the construction may be used without mercury as a purely gravity device for the recovery of the metal, and will be found very efficient in action for separating the waste material from the heavier metal and metal bearing particles which will be collected in the central longitudinal portion of the pan, that is, in groove 49, if the latter be employed. The movement is also very efficient in separating material by screening and is utilized for that purpose in other rockers in this apparatus.

As shown in the drawings and as is preferred, the two movements are so timed by the relative size of pinion 79 and gear 80 that the rocker receives two complete horizontal oscillating movements to each complete vertical rocking movement, and by this timing with the two crank movements shown I secure the most efficient operation of the rocker for the separation and recovery of the metal although this part of the invention is not limited to these specific movements or timing.

The conveyer E by which the waste material is delivered from the separator B and the rocker P may be of any suitable construction and it will be understood that any other suitable means besides an endless chain elevating conveyer, as shown, may be used. Such a conveyer, however, will usually be found most convenient in practice, and certain features of the conveyer construction shown form parts of the present invention. This elevating conveyer in the form shown consists of an endless chain 81 running over sprocket wheels 82 at its opposite ends and supporting rollers, and being shown, as provided with a common means for raising and lowering the outer end of the conveyer, consisting of the cable 83 passing around pulleys 84 and connected to a drum, gear and winch mechanism 85 by which the cable may be wound up or unwound for raising or lowering the elevator. In connection with such an adjustable conveyer it is important that means should be provided by which the movement of the lower end of the conveyer shall not result in leaving space for the flow of material backward and downward therefrom between the delivery chute and conveyer, as would be the case if the lower end of the conveyer simply moved toward and from the end of the chute D. I avoid this difficulty by attaching to the lower end of the conveyer a boot 86 which covers the sides and rear of the bottom end of the chute D and is of sufficient width so as to always cover the lower end of the chute as the boot is raised and lowered with the conveyer, this boot being pivotally connected to the lower end of the chute D at the forward end of the boot by slots in the boot through which pass bolts 87 on the chute, so that the forward end of the boot is held vertically in position on the chute, while at the same time the free swinging movement of the rear end of the boot with the conveyer is permitted.

The buckets $l$ of this conveyer are preferably of the improved construction shown in detail in Figs. 38 to 40. They are each composed of a plate of sheet metal so cut as to form the rear side 88 and the opposite ends 89 of the bucket and, when bent up at an angle to the bottom, form meeting edges at the two rear corners making a tight joint. Along the bent edge forming the union of the side 88 with the bottom of the bucket, holes 90 are formed, and at the forward edge of the bottom plate of the bucket and corresponding to these holes are provided projections or fingers 91, the projections 91 of each bucket being so constructed as to be passed upward through the holes 90 of the next bucket and be bent over to form hinges in connection with rods 92 forming the pintles of the hinges and which are passed through openings 93 in the ends 89 of the buckets. The buckets thus formed are made into an endless elevator, as shown in detail in Figs. 38 and 39, by lapping the ends 89 of each bucket over the ends 89 of the next preceding bucket, with the bent fingers 91 projecting through the openings 90 of the preceding bucket, and securing the two buckets together and at the same time forming the hinge by inserting the rod 92 through the bent projections and the corresponding holes in the end pieces 89 of the lapped buckets, and securing them in place, as by heading the rods outside the ends 89, the buckets thus formed being secured to the carrying chain in any suitable manner by the bottom plates of the buckets.

Returning now to the parts of the apparatus for treating the material delivered from the separator B through the tank C to the tank 47, as previously described, this material may be raised to the tank G or delivered directly to the rocker H by any suitable means, but in the construction shown, the bucket elevator F is shown as of a common construction employing buckets 94 carried by chains 95 and running over sprocket wheels 96 at top and bottom of the machine, so that these buckets are carried through and load within the tank 47 at the bottom of the machine and unload the material into the tank G at the top of the machine.

An important feature of the construction shown consists in the jet pipes 97 fed through pipe 98 from any suitable source and arranged to direct one or more jets of water directly into the buckets 94 as they turn around the sprocket wheel 96 for delivery of their contents to the tank G. It is found in practice that a jet or jets of water thus applied act to break the air seal of the sand within the buckets and secure the delivery to the tank G of the sand, which otherwise is liable to be retained within the buckets so as not to be delivered thereto.

It is desirable that the buckets should run as close to the bottom of the tank G as possible consistently with the proper delivery of the material, in order to prevent the splashing of the water and wet sand which would result from the dropping of the material a considerable distance from the buckets, and in order to prevent splashing of the material from the shallow tank which I preferably use for this purpose, I have provided a splash plate 99 extending transversely to the line of movement of the buckets, on the rear side of which the material is delivered by the buckets, and which is preferably curved over rearward so as to prevent splashing of the material upward from the tank as delivered by the buckets. On the opposite or forward side of this splash plate 99, space is provided within the tank for the reception of drip from the buckets, and both sides of the splash plate 99 preferably deliver as shown to the single delivery pipe 100 which is formed so as to open upon both sides of the plate 99. This material is to be treated to a further separation, so as to be divided into fine and less fine material, the former passing to the amalgamator and the latter to gravity devices for recovering the metal therefrom, preferably with the aid of amalgamation. The second separator in the preferred construction shown in the general views and in detail in Fig. 30 consists of the rocker pan H to the rear end of which material from tank G is delivered by pipe 100. This pan H has the same movement and operating parts as the pan P, previously described, and for simplicity and clearness the same reference numbers will be applied to the mounting and operating parts shown in connection with this pan as applied to corresponding parts used with pan P, and no further description of the mounting or movement of this pan H need be given.

The pan H is preferably of the same general shape as the pan P but, instead of the groove and mercury pots at the bottom of the latter, this pan H is provided with a bottom screen 101, preferably forming a considerable portion of the bottom of the pan and over which the material passes from the receiving end to the delivery end, which latter end is provided with the delivering chute or pipe 102 which delivers through the chute 103 to the next rocker pan I. This screen 101 is preferably of quite fine mesh, this depending somewhat upon the character of the material to be treated and with my improved washer and separator B and means for treating the less fine material, may be so fine as to pass but a comparatively small amount of material to the amalgamator. This screen, as shown, is preferably a bar screen so as to provide long, narrow openings through which the fine flake metal will pass, which otherwise would be retained by a square mesh of the desired fineness.

The pan H is closed at the top preferably throughout its length, as shown, and carries at the top on opposite sides pipes 104 provided with a series of jet pipes 105 pointing downward at an angle so that the streams therefrom converge toward each other and are discharged directly upon the material in the pan, these pipes 104 being supplied with water from any suitable source through flexible connections 7 so as to permit the jet pipes 104 to move freely with the pan H. Only one of these jet pipes, or more than two may be used, but a plurality with converging jets are preferably employed. This pan H thus forms a washer and separator in which the material is thoroughly washed by the water from jet pipes 104 and the downward jets act to force the fine material through the screen 101 and secure its proper separation from the less fine material which passes over the screen and through the pipe 102, the forcing of the metal through the fine screen acting also to scour the particles and prepare them for the amalgamator. The fine material and water passing through the screen 101 are delivered into the tank $m$ in which the pan H is mounted and at the lower end of the screen 101 is a guard 106, which is preferably curved or inclined rearward of the pan, as shown, to prevent the water from splashing out of the tank $m$ as it is delivered thereto and still permit the vertical rocking and horizontal oscillating movement of the pan H, for which movement the end of the tank $m$ must be cut away, as shown.

The jet pipes 104 preferably extend substantially to the lower end of the pan H so as to thoroughly wash the bottom of the pan beyond the screen 101 and secure the delivery of all the less fine material through the pipe 102 to the rocker pan I, which forms a gravity device for the recovery of the metal therefrom, preferably employing amalgamation as in the case of rocker P. This pan I is shown as and preferably is identical in construction with the pan P except so far as it may be varied for treating finer material, and the mounting, movement and operation of this rocker are the same as those of that pan and as previously described, the metal being recovered by removable mercury cups similar to cups $k$, the waste solid material from this pan passing through the delivery end directly to the conveyer E, and any water from the same preferably being delivered to tank C.

The fine material and water delivered to the tank $m$ from the pan H through the screen 101. which material contains the very fine metal and metal bearing particles, flows from the tank $m$ through the central pipe 107 and the branch pipes 108 to tanks $n$ arranged at opposite sides of the machine, and from which the material passes to the amalgamator, this material being distributed in tanks $n$ in both directions from the central delivery pipes 108 by the right and left screws 109 rotating within the circular tanks $n$, so that the material is distributed uniformly through the entire length of the tanks $n$ and over the pipes which convey the material to the amalgamator. Referring now to the amalgamator K, shown in detail in Figs. 16 to $22^a$, all the parts of this apparatus are inclosed within a housing 110 composed preferably of metal plates and acting to protect the interior parts from air currents, dust and interference from other causes, which housing may be supported in any suitable manner in the frame of the machine. Within this housing is suspended an open frame shown as and preferably being a rectangular framework formed by the bars 111 and suspended so as to swing freely within the housing 110 by eye bolts 112 connecting block 113 at the top of the housing 110 with block 114 at the top of the frame 111. The frame 111 thus swings freely so as to be level although the apparatus be inclined as it frequently will be, especially when mounted so as to be moved along a bank or excavation or carried by a boat. For the purpose of balancing the frame and parts carried thereby, so as to assure the maintenance of the level of the frame 111, a counter balance is preferably used, this consisting in the preferred form shown of weights 8 at the lower corners of the frame hung and adjustable on racks 9.

Within the suspended frame 111 are mounted a series of vibrating cradles $q$, four being shown, these cradles being suspended from the opposite side bars 111 by swinging links 115 at opposite sides, so that each of these cradles will swing freely longitudinally of the machine. These swinging cradles are actuated from a vertical shaft 116 mounted in the frame 111 at one end of the cradles and driven from the driving pulleys 117 above the housing 110 by belt 118 passing over guide pulleys 119 and around pulley 120 on the upper end of shaft 116, as shown in Figs. 2 and 17, the belt 118 being driven from any suitable source of power or running part of the machine. The shaft 116 actuates the cradles $q$ through eccentrics 121 on the shaft and eccentric rods 122 connected to the cradles and these eccentrics are preferably adjustable on the shaft so as to vary the throw according to the material to be treated, and secure the desired relative movement of the cradles. These eccentrics are preferably set, as shown, so that two of the eccentrics are directly opposite the other two in their position relatively to the shaft, so that two of the four swinging cradles are at one limit of their movement and the other two swinging cradles at the opposite limit of their movement at the same time, and the cradles move in pairs in opposite directions simultaneously. The result is that the side pressure upon the cradles which otherwise would act to swing the frame 111 from the level is counterbalanced so that no side movement of this frame results from the operation of the swinging cradles, but the level position of the frame, which is the object of its central suspension, is secured notwithstanding this movement of the swinging cradles.

Within each of the cradles $q$ are two sets of amalgamating plates $r$, the pans of each set being arranged side by side and the sets being arranged one above the other and inclined in opposite directions, the delivering ends of the plates of the upper set being above the receiving ends of the plates of the lower set so that material passing from a plate of the first set is delivered to and then passes over a plate of the second or next lower set. The pans of each set are preferably made quite narrow, and any desired number of plates may be used in each set, eight being shown in the present case, the number of these plates depending, of course, upon the amount of material to be treated in the amalgamator. These pans are independent, that is, the material is prevented from passing sidewise from one plate to another, and are preferably removable separately from each other, and made so as to be readily inserted into and removed from their cradles $q$, so that each of the pans may readily be removed and replaced, as required, the supports in the cradle $q$ being preferably provided with rollers 123, as shown, on which the plates are run in and drawn out of the frames. These plates are preferably formed as shown in detail in Fig. 20 so as to fit closely within the correspondingly inclined side supports 125 between which they are held firmly against sidewise movement in the frames $q$, and are preferably extended above the supports 125 and provided with inwardly inclined flanges 126, so as to prevent splashing of the water and other material off the plate during the sidewise movement of the plates with the swinging cradles $q$.

The plates are preferably provided with steps or riffles 124, forming mercury cups behind the steps as shown in Figs. 20 to 22ª, and these steps are preferably formed as shown so as to provide a downward inclined surface behind the mercury cups and a sharp upward incline forward of the cups. Above each of the plates $r$ are arranged a series of transverse spray pipes 127 carried by and fed from pipes 128 carried by frame 111 and extending longitudinally of the pans and preferably central thereto, as shown, these pipes 128 being carried by and connecting with cross pipes 129 through which the spray pipes 127 are fed from any suitable source, flexible connections 200 being used to permit the movement of the spraying pipes with the frame 111. These spray pipes 127 extend substantially the full width of the plates $r$ and are arranged with a spray pipe for each step or riffle 124 of the plates. These spray pipes 127 are provided with small perforations 5 on their underside, which perforations are preferably arranged in rows staggered transversely to the spray pipe, as shown, so that small perforations considerably separated lengthwise of the spray pipe may be used, while at the same time there is substantially no line longitudinal of the plates $r$ but what is directly under the action of streams from the perforations 5, and all the particles of matter passing over the plate receive the direct action of the stream from the successive spray pipes. I preferably form these spray pipes and arrange the openings 5, as shown, the pipes being formed with two spray surfaces set at an angle to each other, the rear surface being approximately parallel with the downward inclined surface of the plate so that the streams therefrom are thrown at substantially right angles to the plate and into the mercury cups, and act to force the particles of metal directly into contact with the amalgamating surface of the plate and into the mercury cups and the streams from the other spray surface are directed forward or generally in the line of movement of the material passing over the plates so as to act to force the material onward as it passes over the top of the steps 124. The angle between these two spray surfaces of the pipes 127 is preferably arranged directly opposite the mercury cups formed at the bases of the steps 124, and a row of the perforations 5 is preferably formed directly on this line so that the streams from this row of perforations point directly downward into the mercury cup. The number of rows of perforations 5 may be varied, but seven are shown, four series of perforations being on the rear inclined surface of the pipe, one row on the angle and two rows on the forward inclined surface. This number of rows of perforations and arrangement will be found very efficient.

The spray pipes 127 may be supplied with either water, compressed air or steam, but I preferably use compressed air. These spray pipes act to force the particles of metal into the mercury over and over again and against or into contact with the amalgamating surfaces, so as to assure the recovery of all the precious metal during the passage of the material or pulp over the amalgamating pan. The speed of movement of the pulp may be increased or diminished by suitably regulating the pressure of the air, or steam or water passing through the spray pipes, and the same result may be secured by arranging the angle of impingement of the spray upon the material. The pipes 127 may also be adjustable toward and from the plates, if desired.

The material to be treated or pulp passes from the tanks $n$ to the amalgamating plates $r$ through flexible pipes 130, these pipes being arranged in series along the tank according to the position of the amalgamating plates $r$ to be fed thereby, each of these pipes feeding a single plate of the top row of plates in each vertical series of two plates. Upon these pipes 130 are placed vessels $s$, the pipes 130 entering at the top of the vessels $s$ and leaving the vessels at the bottom, and passing thence to the receiving ends of the amalgamating plates $r$ where they are expanded sidewise of the plates and contracted longitudinally of the plates so as to form nozzles 131 extending over a considerable portion of the width of the pans and acting to distribute the material passing through them widthwise over the receiving end of the pan. The vessels s serve as washing and chemical treating vessels for the material, and, in the preferred form shown, consist of elliptical metal vessels entered at the top and bottom by the pipes 130 and on one side by the water pipe 132 and on the opposite side by a pipe 133 for the purpose of introducing a suitable chemical for either the alkaline or acid treatment of the material, or for the purpose of clearing the mercury on the amalgamating plates.

For the purpose of securing an intimate contact of the water from pipe 132 and the chemical from pipe 133 with the material passing through the vessels s the material from pipe 130 passes directly onto a conical spray plate 134 by which it is sprayed outward in all directions through the vessels s so as to be delivered in a continuous thin spray near the sides of the vessel. This spray plate 134 has beneath it and secured thereto in any suitable manner a plate of similar form placed close thereto so as to provide a spray space between the two plates, and the space between the plates 134 and 135 is entered by the water from pipe 132 through nozzle 136 on the pipe 132 which passes through a central opening in the plate 135, and may be supported by being secured thereto. This nozzle 136 is entered below the spray plates by a nozzle 137 on the chemical pipe 133 so that the chemical from pipe 133 is thus introduced into the water in pipe 132 and the water and chemical are sprayed from between the plates 134, 135 outward and against and through the spray of the material from the tanks n, as the latter is thrown outward in the vessels s by the spray plate 134, an intimate and forcible contact and mingling of the finely divided water and chemical with the finely divided particles of the material to be amalgamated thus being obtained, so that a thorough washing and chemical treating of the particles is secured. The pipes 132, 133 are fed from, respectively, pipes 138 and 139 extending along the row of amalgamating pans and connecting with any suitable water and chemical supply.

The water and waste material or tailings from the amalgamating pans passes from the delivery end of the bottom pan of each vertical set of two pans into troughs 140 running along the side of the machine opposite the delivery end of the pans and inclined so as to deliver their contents to vertical pipes 141, which in turn deliver to a tank 142 at the bottom of the machine through which the bucket elevator L, shown as similar in construction to the elevator F, raises the material to and delivers it into the tank M at the top of the machine which is similar in construction to the tank G previously described and from which this material passes through the delivery pipe 143 to the receiving end of rocker pan N. This rocker pan N is mounted in the upper part of the tank t and is mounted and operated with a combined vertical rocking and horizontal oscillating movement by the same means as rocker P, H, I and as already fully described in connection with rocker P. No further description of the mounting or actuating means for this rocker, therefore, need be given, the parts shown in connection with this construction being lettered correspondingly to those of rockers P, H. The function of this rocker is to separate out the solid material or tailings from the waste material received from the amalgamator and, preferably, to separate the liquid portion of such material into two parts so that the cleaner portion may be returned to the tank C for reuse and the sand bearing or dirtier portion run to waste. For this purpose, the pan N and tank t are constructed as shown in Figs. 31, 32, and as follows:—A considerable portion of the bottom of the pan N is formed of screen 144 for which the common square mesh screen may be and preferably is used, through which passes the liquid from the tank N as the material passes over this screen. Below this screen 144 is a second inclined screen 145 of finer and preferably very fine mesh so as to take out all the fine solid material from the water so that the clean water passes through the screen 145 into the tank t on one side of the partition 146, while the fine particles of solid matter with some portion of the water pass from the lower end of the screen 145 to the opposite side of the partition 146, the water thus being separated into two portions, the clean water passing from the tank t through pipe 147 and the dirty water from the tank through pipe 148. As shown, these two pipes connect with a delivery pipe 149 on opposite sides of the gate 150, so that by raising this gate both the clean and dirty water may be run to waste, if desired, or if the clean water is to be used over again, the gate 150 may be closed and only the dirty water from pipe 148 run to waste, while the clean water from pipe 147 passes to the hopper A through pipe 10 which connects with the side of the pipe 147 between the tank t and the gate 150 and with the side of the hopper A, as previously described and shown in Figs. 1 and 2. On the underside of the pan N and opposite the lower end of the screen 145 is a splash plate 151 which prevents the splashing of the water out of the tank t through the opening at the lower end left for the rocking and oscillating movements of the pan N.

The tailings from the pan N that do not pass through the screen 144 pass from the lower or delivery end of the pan and through pipe 152 and a chute 153 to the conveyer O, which, as shown, consists of a series of flat buckets 154 carried by a cable 155 running over sprocket wheels 156 and carrying the material through pipe 157 to chute 158 through which it is delivered to the conveyer E and thus away from the machine with the waste material from the separator B and rockers P, I. These tailings may be otherwise delivered, however, if desired.

Many modifications may be made in the apparatus shown while retaining the broader features of the invention. Thus, while the construction of chamber 25 heretofore described and the means for delivering the gravity material from this chamber to the rocker P will be found efficient, it may in some cases be preferable to use some other form of conveyer or pump, and I have shown in figure 34 a modified construction in which a screw conveyer is used for delivering this material from chamber 25 to the rocker. In this construction, the chamber 25 is provided with a bottom 159 inclined toward the side of the machine at which the rocker P is placed, which is the opposite side from that at which it is placed in the machine shown in the general views, and, at the lowest level of the chamber 25 so that the material will flow thereto over the inclined bottom 159, is a screw conveyer 160 running in a pipe 161 so as to raise the material from the chamber 25 and deliver it through chute 162 to the rocker P. Other suitable devices may be used in place of screw 160. The rocker P in this construction delivers the waste solid material from its delivery end to chute 163 by which it is delivered to the hopper D so as to be delivered from the latter to the conveyer E with the coarse material delivered to the hopper D from the separator B.

While the rockers H, N will be found most efficient in action in separating out the fine material to be treated by the amalgamator from the coarser material to be treated by rocker I, and for separating the tailings from the water and the dirty from the cleaner portion of the latter, my combined vertically rocking and horizontally oscillating movement securing a very efficient action for these purposes, it is possible to substitute for these rockers H, N separators having a rotary movement, as I have found in practice that rotary separators of proper construction will secure an efficient action in these positions, avoiding the clogging of the fine mesh screens necessarily used which would result from the use of separators having simply an oscillating movement.

In Figs. 35 and 36 I have shown a rotating separator that will be found efficient in substitution for the rocker H, this rotating separator being mounted so as to deliver the fine material to be treated in the amalgamator to the tank m, and the less fine material to chute 103 and thus to the rocker I for further treatment, both as in the construction previously described. In this construction the rotating separator consists of a cylinder R provided with heads forming flaring receiving mouth 164 and discharge mouth 165, the larger portion of the covering of the wall of this cylinder consisting of fine mesh bar screen 166 corresponding to the bar screen 101 and used for the same purposes; this portion of the cylinder being above the tank m, so that the material passing through the screen is delivered thereto and thus to the amalgamator, as previously described, and the wall of the delivery end of the cylinder being formed of a solid plate 167 over which the solid material not passing through the screen 166 passes, the material being fed through the cylinder from the receiving end to which it is delivered from pipe 100 by a pair of feed spirals 168 arranged close to the inner surface of the cylinder and delivering the material to a pair of lifting discharging buckets u generally similar in construction and action to buckets d previously described in connection with separator B, these discharging buckets, however, not necessarily being cut back at their delivery ends to provide exit space for large material, as no large material passes through this separator. For washing the material in this separator and to secure the proper action of the latter and force the fine material through the screen, I use water jets as in the case of the rocker H, and preferably employ the construction shown in Figs. 35 and 36 in which a jet pipe 170 runs longitudinally through the center of the separator and is perforated on its under side so as to discharge jets downward directly upon material beneath it and preferably at or close to the bottom edge of the body of material in the separator, as shown in Fig. 36, in which the position of the material inside the separator is shown by the line x. Another jet pipe 171, preferably mounted as shown by pipe arms 172 on the jet pipe 170 so that the pipe 171 is fed from pipe 170, is arranged between the pipe 170 and the wall of the cylinder, preferably just inside the feeding spirals 168, as shown, this pipe 171 delivering a number of jets just at the upper or breaking edge of the body of material in the separator, as shown.

By this construction the material is thoroughly washed and the proper action of the separator secured, while at the same time a smaller amount of water is required than would be necessary if the jets were thrown upon the thicker portion of the body of material in the separator, and an efficient action is thus secured with a minimum of water.

In Fig. 37 I have shown a construction of rotating separator that will be found efficient in substitution for the rocker N and for separating the tailings from the water and dividing the latter into two parts so that the clean water may be used again, if desired. In this construction the separator consists of a cylinder S provided with a receiving mouth 173 entered by the pipe 143, previously described, and covered from the receiving mouth through the larger portion of its length with a fine mesh screen 174 corresponding to the fine mesh screen 145 of the rocker N and over the rest of its length to the delivery end with a coarser mesh screen 175 corresponding to the screen 144 of the rocker N. Within the separator is a single feeding spiral 176 arranged close to the screens 174, 175 and extending throughout the entire length of the cylinder from the receiving to the delivering end, so that the tailings are delivered thereby directly from the cylinder to the chute 153 and thence to the conveyer O as in the construction previously described in connection with rocker N. As shown in Fig. 37 the fine mesh screen extends to or slightly beyond the partition 146, so that the clean water which passes through this fine mesh screen 174 is delivered to the tank $t$ on one side of the partition 146 and thus delivered to the pipe 147, as previously described, while the dirty water passing over the fine mesh screen 174 is delivered through the coarser mesh screen 175 to the tank $t$ on the opposite side of the partition 146 and thus through the pipe 148. The flanged head 177 shown in Fig. 37 at the delivering end of the cylinder is closed, as no material is delivered thereby, but forms a support for mounting and actuating the cylinder, as in the case of separators B, R.

The operation is as follows:—For convenience, the apparatus will be described as acting on gold bearing material, although it will be understood that the same description applies in connection with the recovery of other metals. The material to be treated is delivered into the hopper A by a steam shovel or any other suitable means and passes with water admitted to the hopper through pipe 10 into the inner cylinder 14 of the separator B, the material being drawn into the spiral $a$ from the hopper A, so as to keep the passage clear and assure the proper feeding of large bowlders, stones, or coarse gravel, by the raking fingers $b$ running under offset 32 at the bottom of the hopper, and the spiral blades $c$, into which these raking fingers are developed within the feeding spirals $a$, acting to secure the rapid forward movement of the material through the first part of the feeding spiral $a$ so as to distribute it over a considerable portion of the latter and thus keep the receiving end of the spiral from clogging and secure the passage of the finer material between the successive spirals. By this feature, the proper action of the feeding spirals and screens 14, 15, from the very receiving end of the separator is secured so that the entire length of the separator is utilized and a shorter separator may be used with more efficient action than otherwise.

The material within the inner screen 14 is fed along slowly through the cylinder by the feeding spiral $a$ and the feeding blades $e$, the material that is too coarse to pass between the successive spirals of the feeding spiral $a$ being advanced within the spiral $a$, and the smaller stones and finer material that will pass laterally upon the spiral $a$ gradually passing into the space between the spiral $a$ and the inner screen 14, and being fed along through the separator within such space, the material that is of sufficient fineness gradually passing through the openings 1 in the screen 14 into the outer chamber between screens 14, 15. The plows $h$ on the inside of the feeding spiral $a$ aid materially in liberating the free gold and gold bearing sand and in maintaining the free, loose condition of the material essential to the proper feeding of the material through the separator and the separating action of the latter. These plows act by plowing through and cutting up the material as the separator rotates, and by raising the larger stones and letting them fall back upon the material, which aids in breaking up the latter and in preventing the clogging which is liable to occur in handling such wet sand mixed with larger material of various sizes.

Between the spiral $a$ and the teeth $e$ are fed the larger flat stones, and other material which is of such size and form as to pass out of the spiral $a$ and not pass between the teeth $e$, such material being fed by the outer edges of the bars forming spiral $a$ and by the teeth $e$. The finer material, including the sand and small stones, passes to the inner screen 14 between the teeth $e$ and is fed and treated thereby, so as to secure the passage through this screen of the finer material, including the free gold and gold bearing sand.

The teeth $e$ in the interrupted spiral formed thereby act upon the material on the inner side of the screen 14 tending to gradually force it forward, and, in their rotative movement, the steps 37 successively lift the material and allow it to drop, thus breaking up and working over the material so as to aid in securing the separation of the finer material from the waste, which lifting action is also performed to some extent by angular webs 36. The plows $f$ over the angles of the teeth $e$ take the strain and wear off the teeth so that greater durability is secured and by their sharp wedge form act to cut up and disintegrate the material without great resistance to the movement of the cylinder. The perforations in the teeth $e$ permit the fine material to pass through them, the angular webs 38 acting also to secure this action, so that the latter will not be carried through the separator but will fall to the bottom of the inner cylinder formed by screen 14 and pass through the inner screen, and the grains of gold and gold bearing sand are thus scoured and prepared for further treatment by passage through the perforations. If this feeding spiral were continuous, it is obvious that the coarse material would be carried onward rapidly through the separator, but the sluiceways 35, 36 between the teeth and between the bases of these teeth and the screen act to permit the water and material to wash back through the spiral so that the finer material is constantly passing back to be carried forward again by the teeth $e$ and is thus repeatedly treated by the teeth so as to be subjected over and over again to a washing, lifting, breaking, scouring and generally disintegrating treatment which assures the separation and passage of all the gold bearing material through the slots in the screen 14. Thus the waste material advanced by the teeth $e$ to the delivery end of the inner cylinder consists of comparatively coarse material from which the free gold and gold bearing sand has been separated and is then delivered by the discharging buckets $d$ with the larger material from the spiral $a$, the water from the material taken up by buckets $d$ flowing back through the perforations therein.

The space between the successive spirals of the feeding spirals $a$ and $e$ and the size of the former will be proportioned according to the character of the material to be treated, and the size, number and arrangement of the sluiceways between the teeth $e$ and between these teeth and the screen 14 also will depend somewhat upon the material and amount of treatment desired and will be varied accordingly, a reduction in the number or size of these sluiceways securing a more rapid passage of the material through the separator with less thorough treatment of the material and an increase in the number or size of these sluiceways securing a slower feed of the material with a more thorough treatment.

The finer material that passes through the perforations 1 in the screen 14 is acted upon in the outer chamber between the screen 14 and outer screen 15 by the interrupted spiral formed by the perforated and curved blades $g$, which gradually move the material over the screen 15, the peculiar curved form of these blades enabling them to plow readily through the material and producing a lifting and dropping action on the material which secures an efficient loosening and screening action upon the material. The finer portions of the material acted upon by these blades passes through the perforations therein so as to be scoured thereby, or slides off the surfaces of the blades, the curved portion of the blades aiding in securing the passage of the fine material through the perforations therein. Thus all the material repeatedly comes into contact with some of the blades so as to expose new surfaces and be thoroughly disintegrated and worked over, so that the fine gold and gold bearing material, including the flour and flake gold, passes through the bar screen 15 forming the outer cylinder and into the tank C and is thoroughly washed and scoured so as to be put in the best condition for further treatment by amalgamation. The coarser material between screens 14, 15, is gradually worked onward by reason of the spiral arrangement of the blades $g$ until it finally reaches the delivery end of the separator, repeatedly passing back through the sluiceways 39, 40 to be advanced again, so that the material is fed slowly through the cylinder and is acted upon repeatedly and for a longer time and a more thorough treatment secured than if these sluiceways were omitted. These sluiceways may be increased or decreased in size or number, or varied in arrangement according to the material to be treated and the treatment desired, as explained in connection with the teeth $e$. Upon the bar screen 15 of the outer cylinder will thus be fed along to the delivery end of the separator a body of comparatively fine material, that is of sufficient fineness to have passed through the slots 1 of screen 14 but too coarse to pass through the finer screen 15 of the outer cylinder. This body of material will be constantly agitated, scoured, washed, and raised and dropped by the action of the blades $g$ and the rotation of the separator, and thus a loose, free condition of this material preserved, with the heavier particles gradually falling to the bottom, so that, when the material reaches the end of the delivery end of the screen 15, the bottom layers of the material on the screen will contain the heavy portion which is the free coarse or gravity gold and gold bearing sand. This free coarse gravity gold and gold bearing material is efficiently removed in my separator by the fingers $i$ forming buckets which act to cut out the bottom portion of the material on the bar screen 15 at the bottom of the separator and to rai  the same and feed it by the rotation of the separator down the top inclined surfaces of these fingers or buckets $i$ and between the rings 16, 33 and through the openings 43 at the end of the separator into the receiving chamber 25 at the end of the tank C, for treatment by gravity devices preferably employing also amalgamation. The depth of material thus removed will depend somewhat upon the character of the material to be treated, and the rate of delivery.

The rest of the material reaching the delivery end of the separator within the space between the screens 14, 15, which is the coarser material from which the heavier portion has been removed is taken by the ends of the loading webs of the discharging buckets $d$ and gradually raised and advanced thereby through openings in the inner screen 14 and through the inner cylinder of the separator so as to be delivered with the coarse waste from the inner cylinder to the chute D and conveyer E. The buckets $d$ are preferably perforated, as shown, to their extreme outer ends so as to permit the water to pass back freely to the separator, but the whole or any portion of the buckets may be unperforated.

It will be seen that all the operations of the separator upon the finer material are carried on while the material is immersed in water, the level of the water in the tank being preferably maintained as high as possible, that is, to the under side of the receiving and discharging mouths 17, 18 and which, in the construction shown, is substantially to the bottom of the space within feeding spiral $a$. During the entire treatment of the material by the teeth $e$ and blades $g$ therefore, the material is being washed so that all the small particles of valuable material are removed from the surfaces of the non-valuable material and the dirt washed off the fine gold and gold bearing sand, so that they are free to pass through the screens. The outer screen is preferably a bar screen as shown, so that the flake gold will pass through the elongated meshes, although a quite fine mesh screen is used, which is possible in my separator.

The separation of the smaller particles of gold and gold bearing material and especially the fine flake and flour gold and its delivery through the screen 15 into the tank C is materially assisted by the suction upon the lower side of the separator B caused by the action of screw 45 within the pipe 46, this screw also maintaining a constant agitation within the tank under which agitation the valuable material collecting therein gravitates to the bottom and to the screw and is thus carried off through the pipe 46 to the tank 47 and the bucket elevator F, by which the material with a certain portion of the water is raised and delivered to the tank G, the overflow pipe 48 providing against any excess of water in the tank 47.

Returning now to the coarse gravity gold and gold bearing sand delivered by the fingers or buckets $i$ to the chamber 25, this material is removed therefrom by the buckets 26, 27 carried by the separator and thus raised and delivered through the chute 28 to the rocker P, with sufficient water for proper treatment, as in the machine shown in the main views, or by the screw conveyer 160 through pipe 161 and chute 162 in the construction shown in Fig. 34. The rocker P by its construction and combined vertical rocking and horizontal oscillating movement, as previously described, keeps the heavy fine material on the bottom, while at the same time all the material is constantly under agitation and kept in a free, loose condition so as to secure the passage of the heavier free gold and gold bearing sand to the bottom layer of the material and to the center of the pan where it is brought into contact with the mercury in the mercury cups $k$, so that, as it passes from the receiving to the delivery end of the inclined pan, these mercury cups take up all the free gold and gold bearing sand from the material treated in the rocker. The pockets 54 act to receive the mercury during the sidewise or vertical rocking movement of the pan, and with the hoods 4 which are preferably used, prevent splashing, so that each mercury cup is independent of the rest and retains its own mercury. Each of these mercury cups is removed when the mercury becomes full of gold and fresh mercury substituted. The waste material is delivered to the conveyer E from the delivery end 58 of the pan P, and the water passing through screen 56 is returned to the tank C so that any fine gold that may have passed to the rocker and not be taken up in the mercury cups $k$ will pass onward from the tank C with the material which has passed through the screen 15 of the separator B. This rocker P, therefore, acts as a gravity and amalgamating device to recover the coarse or shot gold, sometimes called the gravity gold, and the gold bearing sand that is too coarse to pass through the fine mesh of the screen 15. The removal of this gravity gold and gold bearing sand separately from the material passing through the outer screen so as to be treated separately from the fine material that is to pass to the amalgamator, secures very important advantages in my separator and apparatus, as it enables a much finer screen to be used on the separator than would otherwise be possible, thus carrying the process of separation farther and reducing correspondingly the amount of material to be treated in the later processes of the apparatus, while at the same time the recovery of the gold and gold bearing particles is more efficient than can be secured by the delivery of this coarse or gravity gold from the separator with the fine flake and flour gold. The use of a finer mesh screen on a separator is of especial value in an apparatus combining an amalgamator with the separator for the treatment of the fine material, as the amount of material passing to the amalgamator is largely reduced which enables a machine to handle large quantities of material at a high rate of speed, while at the same time the desired slow passage of the material over the amalgamating plates is permitted, so that the material need pass over a smaller extent of amalgamating surface than would otherwise be required, and the material may be passed over the amalgamating surfaces in a thin body which, with the finer material treated, secures a very efficient action and enables the fine flour gold to be thus recovered, which is impossible where a larger body of material or coarser material passes over the amalgamating surfaces with the gold. In the apparatus shown, a division of the material passing from the separator to the tank C is made, so that only the very finest material passes to the amalgamator K, and such a division of the material is greatly preferred as reducing still more the size and amount of material treated by the amalgamator, but it will be understood that this division may be omitted and greatly improved results be attained over present practice, and the invention includes various combinations and features of construction in such an apparatus.

Returning now to the material delivered from the tank C to the tank G, the fine material then flows from the tank G through the pipe 100 to the rocker H, a certain amount of water having been added to the material through the jet pipes 97 which operate to wash out the buckets 94 and break the seal of the material so as to secure the emptying of the buckets into the tank G, the rocker pan H thus receiving all the material from the separator B that is of such fineness as to pass through the bar screen 15 of the outer cylinder. The material in the rocker H, therefore, consists of a pulp containing comparatively fine sand and gold, including flake and flour gold, mixed with a certain amount of water. Within the pan H, this material is thoroughly worked over and washed by the vertical rocking and horizontal oscillating movements of the rocker and the heavy gold and gold bearing sand brought next the screen 101, while the jets of water from the jet pipes 104 directed downward upon the bottom of the rocker act to force the fine gold and gold bearing sand through the fine screen 101, the bar mesh permitting the passage of the flake gold. By this rocker therefore, another washing and separation of the material is secured, the very fine gold and gold bearing sand passing through the bar screen 101, by which it is again scoured, into the tank m and thence through the pipes 107, 108 to the distributing tanks n for the amalgamator K, a certain amount of water accompanying this material, and the less fine portion of the material in the pan H, including the gold and gold bearing sand that is too coarse to pass through the screen 101, being delivered, with some water passing over screen 101 and the water from jets 105 below the screen, through the pipe 102 to the rocker I, in which the operation upon this finer material by gravity and amalgamation is exactly the same as described in connection with that of the rocker P on the coarser material received by the latter, the free gold and gold bearing sand in rocker I being recovered in its mercury cups, the waste solid material being delivered to the conveyer E and the water being preferably returned to the tank C to save the water and so that any fine particles of gold that may possibly remain therein will be subjected to further treatment. The course of the material is the same if the rotating washer and separator R of Figs. 35 and 36 be substituted for the rocker H, the fine material passing through the bar screen 166 into tank m and thus to the distributing tanks n, and the less fine material being delivered by the discharging buckets u through chute 103 to the rocker I.

It will be seen that, by the operation thus far described seven separations of the material have been had, four separations being secured by the separator B, one separation by the rocker P, and two separations by the rockers H, I, and that the material to be acted upon by the amalgamator has been reduced by the screening through the inner and outer screens 14, 15 of the separator B, and the finer bar screen 101 of the rocker H, so that only the very fine material, which contains the gold and gold bearing material that can be separated practically only by amalgamation passes to the amalgamator. As above stated, the most efficient results are secured by the use of all these separators, including the recovery of the finest flake and flour gold, which heretofore has not been efficiently recovered, and I thus provide an apparatus capable of handling material at a rate far in excess of the capacity of machines heretofore constructed for this purpose. I may omit some of these separations, however, either in the first washer and separator, or later, and still secure results greatly improved over those heretofore attained. The material delivered to the tanks n, as above described, is distributed by the double worms 109 uniformly through the entire length of the tanks n and over the series of pipes 130, so that this material or pulp is uniformly fed to the amalgamating plates $r$, one of which is fed by each of these pipes.

As the material flowing through the pipes 130 reaches the vessels $s$, and just before the amalgamating process, it is spread outward in a thin sheet on all sides of the vessel by the spraying plate 134, and at the same time a thin sheet of water from pipe 132, preferably treated with a suitable chemical introduced through pipe 133, this chemical depending upon the particular process to be used and character of the material, as well understood in the art, is sprayed outward from between plates 134, 135 so as to bring it into intimate contact with all the particles of material sprayed by the plate 134 and thus secure a thorough washing and chemical treatment of each of the particles of the material just before amalgamation. The washed material or pulp then passes from the vessels $s$ through the lower ends of the pipes 130 and onto the receiving ends of the amalgamating plates $r$ through the narrow funnels 131 on the ends of pipes 130, the tapering shape of which tends to condense the material and increase the amount of its pressure as it is forced by gravity through the nozzles 131, the pulp thus being scattered or spread over substantially the entire width of the plates and brought forcibly in contact therewith, as it is received thereon, thereby obtaining at once the great advantage of bringing the small particles of the gold and gold bearing sand into contact with the amalgamating surface at the beginning of their journey over the amalgamating plates. The pulp thus delivered to the receiving ends of the amalgamating plates $r$ passes downward over the inclined surfaces of the latter and over the mercury cups formed by the steps or riffles 124 on the plates, being subjected to the lateral bodily agitating movement caused by the sidewise swinging of the cradles $q$ in which the amalgamating plates $r$ are supported, and the free gold and gold bearing particles in the pulp being taken up by the mercury on the surfaces of the plates and in the cups, so that the gold and gold bearing sand is retained upon the pans while the waste material passes onward. As the pulp passes over the plates $r$ it is subjected to the action of the sprays from the spray pipes 127, preferably of air, as previously described, which act to force the particles of the material down again and again into contact with the mercury on the plates and in the cups, so that all the particles are brought again and again into contact with the mercury until retained thereby, if of gold or gold bearing sand. These sprays also tend to increase the speed of onward movement of the material as it passes over the crest of the steps 104 and down the inclines of the amalgamating plates, while the movement over the mercury cups is slow and delayed by the sprays, and thus I get a slow movement where it is important combined with a faster movement where permissible so as to combine speed and efficiency. This result is aided also by the form of the plates with the quite steep inclines and sharp steps. The general onward travel of the material and the action of the amalgamator may be regulated by the inclination at which the plates are set, and the direction and force of the air, water or steam discharged by the spray pipes 127, or by adjusting the position of the spray pipes toward and from the plates in any suitable manner.

The material or pulp passes from the upper plate of each vertical series of two plates to the receiving end of the next lower plate of the series and thus traverses two plates, the waste material being delivered from the lower or delivery end of the second plate $r$ of each series to troughs 140 and thence through the pipes 141 to the tank 142 whence it is carried by the bucket elevator L to the tank $m$, flowing then through pipe 143 with water admitted through the jet pipes 97 to break the seal in the buckets 94 and wash out the sand therefrom to the rocker N.

In traversing the two amalgamating plates of a vertical series, the valuable portions of the material delivered thereto will have been extracted and taken up by the mercury of the amalgamating plates, and, when any plate becomes charged or loaded with gold to an appropriate extent, it will be withdrawn to have its load removed and be at once replaced with a fresh amalgamating plate so that the operation may be continued. For the removal of one of the plates $r$, it is necessary only to shut off the delivery of the pulp through one of the pipes 130 by the cock shown for that purpose, the cock being opened again when a new plate has been put in place, this cutting out of one of the plates interfering in no way with the operation of the rest of the amalgamator, so that a continuous operation of the amalgamator is secured.

The sidewise movement of the narrow plates is very efficient, this operation being made possible in an amalgamator of commercial capacity by the division of the amalgamator into narrow surfaces arranged in series sidewise with partitions to confine the mercury on each surface and prevent its passage sidewise from one surface to another so that a large amalgamating surface is secured with the required even distribution of the material in a thin layer over the amalgamating surfaces. This sidewise agitating movement cannot be efficiently applied to a plate of the width required commercially in amalgamators when a single plate is used, as the sidewise movement of the pulp over a considerable extent of surface is such that the material will not be uniformly distributed, but the material will mass on portions of the surface and other portions of the surface be left bare or substantially so.

The amalgamator in my apparatus operates for the removal of all the free gold and the gold bearing material from the pulp delivered to the amalgamator, and the waste material passing from the amalgamator consists simply of fine sand forming the tailings from the apparatus and a considerable quantity of water. This material delivered to the rocker N is efficiently separated thereby, the clean water passing through the coarser screen 144 and finer screen 145 to tank $t$ on one side of the partition 146 and thence through pipe 147 and by the pipe 10 to hopper A, as shown, or to waste, if it is not desired to use this water over again, and the dirtier portion of the water running off the end of screen 145 and passing to the tank $t$ on the opposite side of the partition 146 and thus to waste through pipes 148, 149, while the tailings are conveniently delivered, as shown, through pipe 152 at the delivery end of the rocker N and chute 153 to the conveyer O and thus through chute 158 to the conveyer E, so that all the waste solid material is delivered by the single conveyer E. It will be understood, however, that this feature is not essential, although desirable, and that the material from the separator B, rockers P, I and N may be delivered separately or in any suitable manner. The final separation of the tailings and the division of the water passing from the amalgamator therewith by the cylindrical separator S, shown in Fig. 37, and the delivery of the tailings and water thereby is the same as by the rocker N, as previously explained in describing the construction of this separator.

By my improved amalgamator, in combination with the separating features of my invention, I provide an especially efficient apparatus of comparatively small size and very high capacity, so that metalliferous earths may be handled directly from the bed at so small a cost and with such efficient recovery of metal that very poor earths may be worked profitably. The small quantity of material treated by the amalgamator and its fineness enable it to be passed over the plates slowly and with a small amount of water, which is impossible with coarser material, and the extent of amalgamating surface which the material must travel is correspondingly reduced, so that with my side by side arrangement of plates I am enabled to provide within the limits of a convenient commercial apparatus for the distribution of the pulp over such an extent of amalgamating surface that the pulp may be spread in a very thin layer increasing greatly the efficiency of the amalgamating process. This efficiency is still materially increased by the spray treatment of this thin body of fine material as described, and by the form of the plates, the efficient leveling of the amalgamator, and other features of my amalgamator.

While, however, an important part of the invention consists in combinations including both separating and amalgamating features of my complete apparatus, it will be understood that my improved amalgamator and separators may be used independently of each other, either alone or combined with other mechanisms, and that many parts of the complete apparatus shown embody in themselves features of my invention independently of other parts and are thus claimed.

It will be understood that many modifications may be made in the form and arrangement of parts in the various devices forming the apparatus shown, and that I intend to cover by my claims such modifications as may be made by those skilled in the art in applying the various features of my invention.

By the term "sluiceways" as applied in this specification and the claims to the openings 35, 36, 39 and 40 between the portions of my interrupted feeding spirals and between these spirals and the inner screen, I mean and intend to include only openings of such size as to permit material of considerable size to pass through them as well as the fine material for the passage of which the perforations through the spirals are adapted, so that the medium sized portion of the material to be treated is worked over repeatedly by the spirals in its interrupted passage through the separator, and by this term "sluiceways" I intend to distinguish from the perforations and other openings used in separators of this general class for permitting the passage through the spirals of the fine material that the separator is designed to recover from the waste material.

What I claim is:—

1. In an apparatus for recovering precious metals from metalliferous earths, the combination with a separator having inner and outer screens, a central feeding spiral forming the wall of a feeding chamber within which the material is delivered to the separator, and perforated feeding spirals between the central spiral and inner screen and between the screens provided with sluiceways through the spirals, and means for removing the metal carrying gravity portion of the coarse material from the separator separately from the rest of the coarse material, of means for treating said gravity material for the recovery of the metal therefrom, a second separator acting on the finer valuable material to divide it into fine and less fine material, means for treating said less fine material for the recovery of the metal therefrom, and an amalgamator for recovering the metal from said fine material, substantially as described.

2. In an apparatus for recovering precious metals from metalliferous earths, the combination with a separator having inner and outer screens, a central feeding spiral forming the wall of a feeding chamber within which the material is delivered to the separator, and perforated feeding spirals between the central spiral and inner screen and between the screens provided with sluiceways through the spirals and means for removing the metal carrying gravity portion of the coarse material from the separator separately from the rest of the coarse material, of means for treating said gravity material for the recovery of the metal therefrom, including a receptacle for said gravity material, and means for actuating said receptacle with a suitable movement for the recovery of the metal by gravity and mercury, a second washer and separator acting on the finer valuable material to divide it into fine and less fine material, means for treating said less fine material for the recovery of the metal therefrom, including a receptacle for said less fine material, and means for actuating said receptacle with a suitable movement for the separation of the metal from the waste material by gravity and mercury, and an amalgamator for recovering the metal from said fine material, substantially as described.

3. In an apparatus for recovering precious metals from metalliferous earths, the combination with a washer and separator for separating the coarse waste from the valuable material, of means for treating a coarser portion of the valuable material by gravity and mercury separately from the finer valuable material for the recovery of the metal therefrom, a second separator acting on said finer valuable material to divide it into fine and less fine material, means for treating said less fine material by gravity and mercury for the recovery of the metal therefrom including a receptacle for said less fine material and mercury and means for actuating said receptacle with a suitable movement for the separation of the metal from the waste material by gravity and mercury, and an amalgamator for recovering the metal from said fine material, substantially as described.

4. In an apparatus for recovering precious metals from metalliferous earths, the combination with a washer and separator for separating the coarse waste from the valuable material, of means for treating a coarser portion of the valuable material by gravity and mercury separately from the finer valuable material including a receptacle for said coarser portion of the valuable material and mercury and means for actuating said receptacle with a suitable movement for the separation of the metal from the waste material by gravity and mercury, a second separator acting on said finer valuable material to divide it into fine and less fine material, means for treating said less fine material by gravity and mercury for the recovery of the metal therefrom including a receptacle for said less fine material and mercury and means for actuating said receptacle with a suitable movement for the separation of the metal from the waste material by gravity and mercury, and an amalgamator for recovering the metal from said fine material, substantially as described.

5. In an apparatus for recovering precious metals from metalliferous earths, the combination with a washer and separator for separating the coarse waste from the valuable material, of means for treating a coarser portion of the valuable material by gravity and mercury separately from the finer valuable material for the recovery of the metal therefrom, a rocker receiving said finer valuable material and acting to divide it into fine and less fine material, means for treating said less fine material by gravity and mercury for the recovery of the metal therefrom including a receptacle for said less fine material and mercury and means for actuating said receptacle with a suitable movement for the separation of the metal from the waste material by gravity and mercury, and an amalgamator for recovering the metal from said fine material, substantially as described.

6. In an apparatus for recovering precious metals from metalliferous earths, the combination with a washer and separator for separating the coarse waste from the finer valuable material, of a second separator acting on the valuable material to divide it into fine and less fine material, a rocker receiving the less fine material and provided with mercury pockets for the recovery of the metal by gravity and mercury, said rocker having a pan mounted to rock vertically about an axis extending in the direction of movement of material passing through the pan and to oscillate on a vertical axis in planes transverse to the axis of rocking movement and means for rocking and oscillating said pan, and an amalgamator for recovering the metal from said fine material, substantially as described.

7. In an apparatus for recovering precious metals from metalliferous earths, the combination with a washer and separator for separating the coarse waste from the valuable material, of means for treating a coarser portion of the valuable material by gravity and mercury separately from the finer valuable material including a receptacle for said coarser portion of the valuable material and mercury, and means for actuating said receptacle with a suitable movement for the separation of the metal from the waste material by gravity and mercury, a second separator acting on said finer valuable material to divide it into fine and less fine material, a rocker receiving the less fine material and provided with mercury pockets for the recovery of the metal by gravity and mercury, said rocker having a pan mounted to rock vertically about an axis extending in the direction of movement of material passing through the pan and to oscillate on a vertical axis in planes transverse to the axis of rocking movement and means for rocking and oscillating said pan, and an amalgamator for recovering the metal from said fine material, substantially as described.

8. In an apparatus for recovering precious metals from metalliferous earths, the combination with a washer and separator for separating the coarse waste from the valuable material, of a rocker receiving a coarser portion of the valuable material and provided with mercury pockets for the recovery of the metal by gravity and mercury, a second separator acting on the finer valuable material to divide it into fine and less fine material and provided with mercury pockets for the recovery of the metal by gravity and mercury, each of said rockers having a pan mounted to rock vertically about an axis extending in the direction of movement of material passing through the pan and to oscillate on a vertical axis in planes transverse to the axis of rocking movement and means for rocking and oscillating said pan, and an amalgamator for recovering the metal from said fine material, substantially as described.

9. In an apparatus for recovering precious metals from metalliferous earths, the combination with a separator having inner and outer screens, a central feeding spiral forming the wall of a feeding chamber within which the material is delivered to the separator, and perforated feeding spirals between the central spiral and inner screen and between the screens provided with return passages for the medium sized material through the spirals, of a rocker receiving the valuable material and acting to divide it into fine and less fine material, devices connected with said rocker for washing the material thereon, a rocker receiving the less fine material and provided with mercury pockets for the recovery of the metal by gravity and mercury, said rocker having a pan mounted to rock vertically about an axis extending in the direction of movement of material passing through the pan and to oscillate on a vertical axis in planes transverse to the axis of rocking movement and means for rocking and oscillating said pan, and an amalgamator for recovering the metal from said fine material, substantially as described.

In testimony whereof I have hereunto set my hand, in the presence of two subscribing witnesses.

PETER N. RAMSEY.

Witnesses:
C. J. SAWYER,
T. F. KEHOE.